United States Patent
Sato et al.

(10) Patent No.: US 8,695,338 B2
(45) Date of Patent: Apr. 15, 2014

(54) EXHAUST GAS CONTROL APPARATUS FOR ENGINE

(75) Inventors: Osamu Sato, Takahama (JP); Etsugou Yanagida, Chiryu (JP)

(73) Assignee: Denso Corporation, Kariya (JP)

( * ) Notice: Subject to any disclaimer, the term of this patent is extended or adjusted under 35 U.S.C. 154(b) by 236 days.

(21) Appl. No.: 13/227,811

(22) Filed: Sep. 8, 2011

(65) Prior Publication Data

US 2012/0060494 A1    Mar. 15, 2012

(30) Foreign Application Priority Data

Sep. 9, 2010   (JP) ................. 2010-201779
Sep. 15, 2010  (JP) ................. 2010-206861

(51) Int. Cl.
*F02B 37/16*   (2006.01)

(52) U.S. Cl.
USPC ............................................ 60/602

(58) Field of Classification Search
USPC ........................................... 60/602; 251/251
See application file for complete search history.

(56) References Cited

U.S. PATENT DOCUMENTS

| | | | | |
|---|---|---|---|---|
| 4,094,285 A * | 6/1978 | Oyama et al. | ............ | 123/568.17 |
| 4,485,626 A * | 12/1984 | Moriguchi et al. | ............. | 60/602 |
| 4,794,758 A * | 1/1989 | Nakazawa et al. | ............. | 60/602 |
| 4,926,636 A * | 5/1990 | Tadokoro et al. | ............... | 60/312 |
| 5,426,992 A * | 6/1995 | Morii et al. | ..................... | 74/409 |
| 6,390,079 B1 * | 5/2002 | Gagnon et al. | ............ | 123/568.23 |
| 6,543,228 B2 | 4/2003 | Deacon | | |
| 6,983,596 B2 * | 1/2006 | Frankenstein et al. | .......... | 60/602 |
| 7,934,379 B2 * | 5/2011 | Kuspert et al. | .................. | 60/602 |
| 2002/0050138 A1 * | 5/2002 | Deacon | .......................... | 60/602 |
| 2006/0137342 A1 | 6/2006 | Delavan et al. | | |
| 2006/0289072 A1 * | 12/2006 | McMullen et al. | ...... | 137/601.01 |

FOREIGN PATENT DOCUMENTS

| | | |
|---|---|---|
| CN | 101067397 | 11/2007 |
| JP | S61-94240 | 6/1986 |
| JP | 62-126224 | 6/1987 |
| JP | 62-162349 | 10/1987 |
| JP | 7-77051 | 3/1995 |
| JP | 9-4740 | 1/1997 |
| JP | 10-89081 | 4/1998 |
| JP | 2008-196332 | 8/2008 |
| JP | 2008196332 A * | 8/2008 |
| JP | 2009-24584 | 2/2009 |
| JP | 2009024584 A * | 2/2009 |

OTHER PUBLICATIONS

English Machine Translation of JP 2008196332 A.*

(Continued)

*Primary Examiner* — Thomas Denion
*Assistant Examiner* — Shafiq Mian
(74) *Attorney, Agent, or Firm* — Nixon & Vanderhye, P.C.

(57) ABSTRACT

A flow rate control valve and a waste-gate valve are operatively linked to a common cam plate, which is driven by an actuator. The cam plate has a first driving portion for rotating the flow rate control valve in a synchronized manner with rotation of the cam plate. The cam plate has a second driving portion for rotating the waste-gate valve in accordance with the rotation of the cam plate, wherein an operational pattern for the waste-gate valve is different from that for the flow rate control valve. As above, two valves are operated by one actuator so as to move independently from each other.

15 Claims, 11 Drawing Sheets

(56) References Cited

OTHER PUBLICATIONS

Office Action (1 page) dated Jan. 22, 2013 issued in corresponding Japanese Application No. 2010-206861 and English translation (1 page).

Japanese Office Action dated Jul. 10, 2012, issued in corresponding Japanese Application No. 2010-201779 with English translation.
Japanese Office Action dated Aug. 7, 2012, issued in corresponding Japanese Application No. 2010-206861 with English translation.
Chinese Office Action issued in Chinese Patent Application No. 201110272328.5 dated Aug. 19, 2013 (with translation).

* cited by examiner

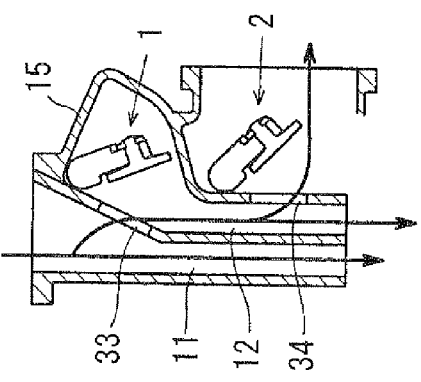
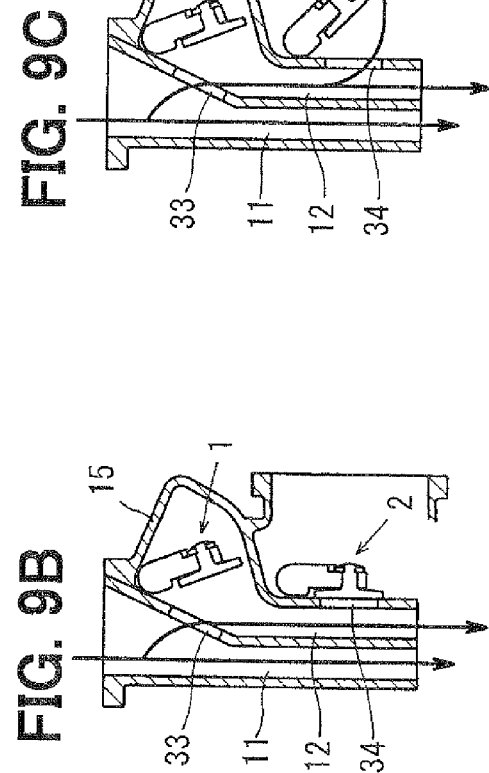
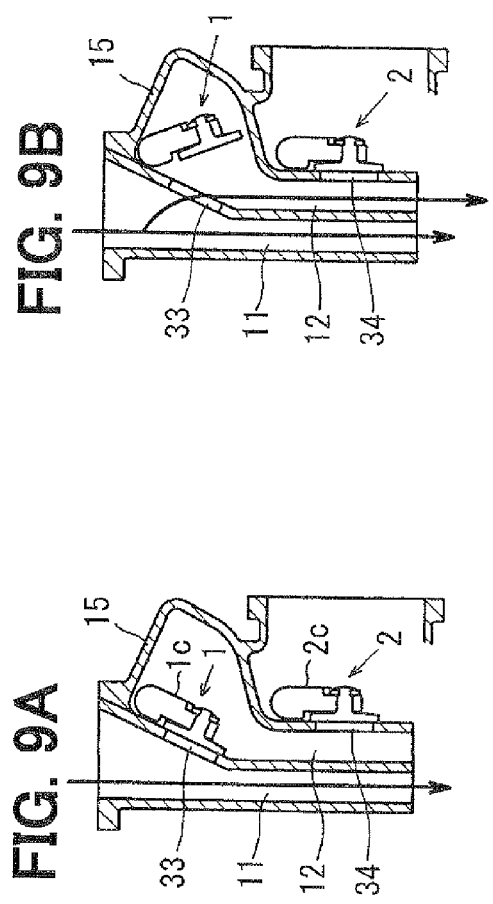
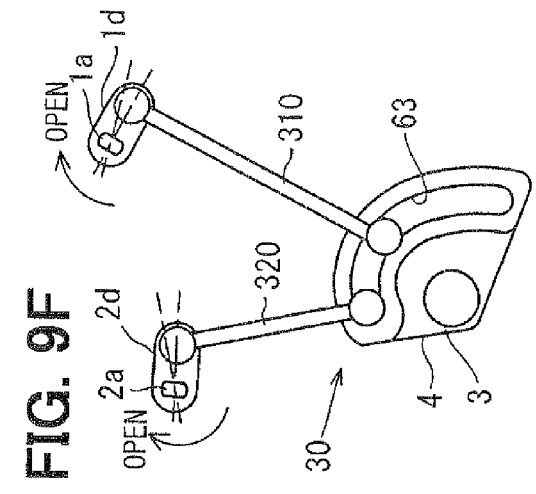
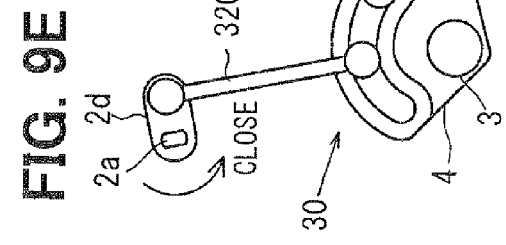
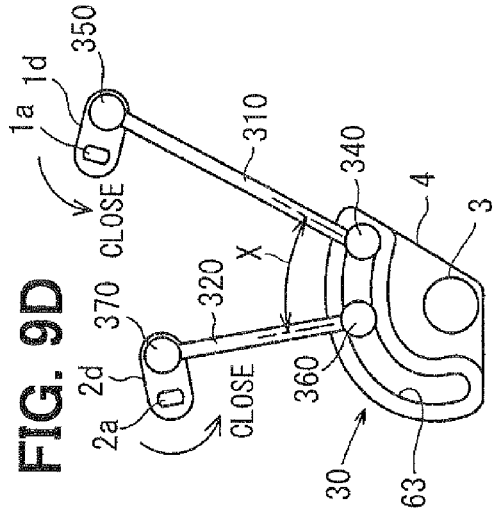

EXHAUST GAS CONTROL APPARATUS FOR ENGINE

CROSS REFERENCE TO RELATED APPLICATION

This application is based on Japanese Patent Applications No. 2010-201779 filed on Sep. 9, 2010 and No. 2010-206861 filed on Sep. 15, 2010, the disclosures of which are incorporated herein by reference.

FIELD OF THE INVENTION

The present invention relates to an exhaust gas control apparatus for an internal combustion engine, in particular, relates to a supercharging pressure control apparatus for controlling supercharging pressure of an internal combustion engine having a turbocharger.

The present invention further relates to a turbocharger having two independent valves, in particular, relates to a driving device for such two valves.

BACKGROUND OF THE INVENTION

A supercharging pressure control apparatus is known in the art, for example, as disclosed in Japanese Utility Model Publication No. S62-162349 (also referred to as Prior Art Publication 1), according to which supercharging pressure is controlled for an internal combustion engine having a turbocharger. The turbocharger supercharges intake air into the internal combustion engine.

According to the turbocharger of the above prior art (Prior Art Publication 1), as shown in FIG. 13, it is composed of a turbine housing 103 connected to an exhaust manifold 102 of an internal combustion engine 101, and a turbine wheel 104 arranged in a center of the turbine housing 103. The turbine housing 103 has a turbine scroll 105 extending from an inlet portion (through which exhaust gas is supplied into the turbine housing) to a wheel accommodating chamber, and a discharging pipe 106 extending from the wheel accommodating chamber to an outlet portion.

An inside of the turbine scroll 105 is divided by a partitioning wall 110 into two passage portions, that is, a first passage 111 and a second passage 112. A switching valve 113 is provided at an inlet portion of the second passage 112. During a low speed running operation, the inlet portion of the second passage 112 is closed by the switching valve 113 so that exhaust gas flows only through the first passage 111, while the switching valve 113 is opened during a high speed running operation in order that the exhaust gas flows through both of the first and second passages 111 and 112.

A waste-gate passage 115 is opened to the first passage 111, wherein the waste-gate passage 115 bypasses the turbine wheel 104 so that the exhaust gas bypasses the turbine wheel 104 and flows to the outlet portion of the discharging pipe 106. The waste-gate passage 115 is opened and/or closed by a waste-gate valve 116, so that the supercharging pressure is controlled at a value, which does not exceed a predetermined maximum supercharging pressure.

Another exhaust gas pressure control apparatus is further known in the art, for example, as disclosed in Japanese Patent Publication No. 2008-196332 (also referred to as Prior Art Publication 2), according to which exhaust gas pressure at an inlet portion of a turbocharger, that is, at an upstream side of a turbine wheel of the turbocharger, is controlled to be a value lower than a predetermined value.

According to the turbocharger of the above prior art (Prior Art Publication 2), as shown in FIG. 14, a turbine wheel 104 is accommodated in a wheel accommodating chamber of a turbine housing 103. A spiral turbine scroll 105 is formed at an outer periphery of the turbine wheel 104. Exhaust gas supplied from an engine (not shown) to an inlet portion of the turbine housing 103 is introduced into the turbine wheel 104 via the turbine scroll 105.

The turbine scroll 105 is divided by a partitioning wall 120 into two passages, namely, a first passage 121 and a second passage 122. At a branching out portion 123, at which the first and second passages 121 and 122 are branched out, a flow control valve 124 is provided for controlling flow amount of the exhaust gas flowing through the second passage 122.

A waste-gate passage 125 is connected to the second passage 122, so that the exhaust gas may bypass the turbine wheel 104. A waste-gate valve 126 is provided at a connecting portion between the second passage 122 and the waste-gate passage 125 so as to control the flow amount of the exhaust gas flowing through the waste-gate passage 125.

A further supercharging pressure control apparatus is known in the art, for example, as disclosed in Japanese Patent Publication No. H10-089081 (also referred to as Prior Art Publication 3), according to which supercharging pressure is controlled for an internal combustion engine having a variable capacitor type turbocharger. In the above turbocharger, an opening degree of a variable nozzle, which is provided at an inlet portion of a turbine rotor, is controlled. In addition, an opening degree of a waste-gate valve, which is provided in a bypass passage so that exhaust gas bypasses a turbine, is also controlled.

According to the supercharging pressure control apparatus of the above prior art (Prior Art Publication 3), as shown in FIGS. 15A to 15C, it has a waste-gate valve and a variable nozzle. It also has a single actuator 107 having an actuator rod 131, to which a driving shaft 132 for the variable nozzle as well as a driving shaft 133 for the waste-gate valve is respectively linked.

FIG. 15A shows a condition of a link structure between the actuator rod 131 and the driving shafts 132 and 133, when an engine rotational speed is in a low range.

FIG. 15B shows another condition of the link structure between the actuator rod 131 and the driving shafts 132 and 133, when the engine rotational speed is in a middle range.

FIG. 15C shows a further condition of the link structure between the actuator rod 131 and the driving shafts 132 and 133, when the engine rotational speed is in a high range.

A further supercharging pressure control apparatus is known in the art, for example, as disclosed in Japanese Patent Publication No. 2009-024584 (also referred to as Prior Art Publication 4), according to which supercharging pressure is controlled for an internal combustion engine having a twin-nozzle type turbocharger. In such a turbocharger, apart of exhaust gas is supplied to a first nozzle through a first passage, while another part of the exhaust gas is supplied to a second nozzle through a second passage.

According to the turbocharger of the above prior art (Prior Art Publication 4), as shown in FIG. 16, an inlet passage of a turbine housing 103 is divided by a partitioning wall 140 into a first passage 141 connected to a first nozzle portion and a second passage 142 connected to a second nozzle portion. A flow rate control valve 143 is provided in the turbine housing 103 for controlling flow amount of exhaust gas respectively flowing through the first and second passages 141 and 142. In addition, a bypass passage 145 and a waste-gate valve 146 are provided in the turbine housing 103, so that exhaust gas pressure may not be excessively increased.

An electromagnetic actuator 108, which is controlled by a control unit 147, drives the flow rate control valve 143 via a rod 149.

When a position of the flow rate control valve 143 is moved by the electromagnetic actuator 108 from a first position to a second position, a through-hole is opened so that the first and second passages 141 and 142 are communicated to each other.

When the position of the flow rate control valve 143 is moved by the electromagnetic actuator 108 from the second position to a third position, the waste-gate valve 146 is moved against a biasing force so that the bypass passage 145 is opened.

According to the above first prior art (Prior Art Publication 1), since the switching valve 113 and the waste-gate valve 116 are provided, it is necessary to provide actuators for respectively driving the switching valve 113 and the waste-gate valve 116. In other words, since it becomes necessary to provide two actuators, a structure of an exhaust pipe of the engine may become complicated and a cost is increased.

According to the above second prior art (Prior Art Publication 2), since the flow control valve 124 and the waste-gate valve 126 are provided, it is likewise necessary to respectively provide actuators for driving the flow control valve 124 and for driving the waste-gate valve 126. In the same manner to the first prior art, it is necessary to provide two actuators, and thereby a structure of an exhaust pipe of the engine may become complicated and a cost is increased.

According to the above third prior art (Prior Art Publication 3), there exists an idling stroke of the actuator rod 131 due to clearances, during which the driving shafts 132 and 133 for the variable nozzle and the waste-gate valve are not actually moved by the actuator rod 131. As a result, the opening degree of the variable nozzle or the waste-gate valve may not be stably controlled, and thereby control accuracy for the flow rate may be decreased and furthermore slapping sound may be generated when the link mechanism is changed from the idling stroke to a working stroke. In addition, it is necessary to provide biasing forces for respectively biasing the driving shafts 132 and 133 toward the actuator rod 131. As a result, an operational force of the actuator 107 for the actuator rod 131 may be increased.

According to the above fourth prior art (Prior Art Publication 4), there exists a clearance between the flow rate control valve 143 and the waste-gate valve 146, slapping sound may be generated when the flow rate control valve 143 is brought into contact with the waste-gate valve 146, or control accuracy for the flow amount may be decreased. Furthermore, it is necessary to provide a biasing force to the waste-gate valve 146 so that the waste-gate valve 146 is pushed toward the flow rate control valve 143. It is, therefore, a problem that an operational force of the electric actuator 108 is increased.

A turbocharger having two independent valves is known in the art, for example, as disclosed in the above Prior Art Publications 1 and 2 and so on.

The turbocharger disclosed in the above prior arts has a variable capacitor type valve (a valve for changing a cross sectional area of a passage, through which exhaust gas flows toward a turbine wheel) and a waste-gate valve.

An opening degree of the variable capacitor type valve is controlled depending on an engine rotational speed, an engine load (an opening degree of an acceleration pedal) and so on, so that a target torque is obtained depending on an operational condition of the engine.

The waste-gate valve prevents an over supercharging condition (an excessive increase of intake air pressure). An opening degree of the waste-gate valve is controlled depending on the supercharging pressure, exhaust gas pressure at an inlet of the turbine wheel and so on.

The variable capacitor type valve and the waste-gate valve are respectively operated depending on the different operating parameters.

According to the above prior arts (Prior Art Publications 1 and 2), two different actuators are provided so as to respectively and independently drive the variable capacitor type valve and the waste-gate valve. It is, therefore, a factor for increasing cost, size and weight of the turbocharger.

Therefore, there is a demand that both of the variable capacitor type valve and the waste-gate valve are operated by one actuator (for example, an electric actuator being composed of an electric motor and a reduction gear) in order to achieve a miniaturization, a decrease of weight, a cost-down of the apparatus.

SUMMARY OF THE INVENTION

The present invention is made in view of the above problems. It is an object of the present invention to provide an exhaust gas control apparatus for an internal combustion engine, which can be easily mounted on the engine, which is lower in weight, and which is lower in cost. It is also an object of the present invention to provide an exhaust gas control apparatus for the engine, according to which an operational force for an actuator may be decreased.

It is another object of the present invention to provide a turbocharger, according to which two independent valves (for example, a variable capacitor type valve and a waste-gate valve) are operated by one actuator, and according to which a deformation of a cam plate by heat is prevented and possible generation of a clearance between the cam plate and a link is prevented.

According to a feature of the invention, for example, as defined in the claim 1, a turbocharger for an engine has a turbine housing having a turbine accommodating chamber therein. A turbine wheel is movably supported in the turbine accommodating chamber and rotated by exhaust gas from the engine.

A first passage and a second passage are formed in the turbine housing for introducing exhaust gas from the engine into the wheel accommodating chamber, wherein the first and second passages are formed by dividing an exhaust gas flow-in passage into two passages in a rotational direction of the turbine wheel. A bypass passage is formed in the turbine housing so that the exhaust gas from the engine flowing through the bypass passage bypasses the wheel accommodating chamber.

A first valve and a second valve are movably provided in the turbine housing so as to control flow amounts of exhaust gases respectively flowing through the first and second passages and the bypass passage by an opening and/or closing movements of the respective first and second valves.

An apparatus further has a valve interlocking mechanism having a cam member for interlocking the first and second valves with each other so as to independently open and/or close the first and second valves from each other; and an actuator for driving the first and second valves by way of the cam member. The first and second valves are movably supported in the turbine housing.

The cam member, which drives the first and second valves to open and/or close independently from each other, has a rotational axis rotatably supported by the turbine housing, a first driving portion for rotating the first valve in a synchronized manner with rotation of the cam member, and a second driving portion for rotating the second valve in accordance with the rotation of the cam member and in an operational pattern different from that of the first valve.

According to the above feature of the invention, the rotational axis, which is rotatably supported by the turbine housing, as well as the first and second driving portions for respectively driving the first and second valves is provided in the cam member. The first valve coupled to the first driving portion is rotated in the synchronized manner with the rotation of the cam member. The second valve coupled to the second driving portion is rotated in accordance with the rotation of the cam member and in the operational pattern different from that of the first valve.

According to such a structure, one actuator is sufficient, to thereby improve easier mounting and realize reduction of the weight and cost.

Since it is possible to reduce the clearance (for example, a play and/or a back-lash) between the first driving portion of the cam member and the first valve, generation of clattering is prevented when the first valve is operated and it is also possible to increase the accuracy for controlling the flow amounts of the exhaust gases flowing through the first and second passages and/or the bypass passage. In addition, since it is possible to reduce the play (and/or the back lash) between the second driving portion of the cam member and the second valve, generation of clattering can be also suppressed and the control accuracy for the flow amounts of the exhaust gases flowing through the first and second passages and the bypass passage can be likewise increased.

Since it is not necessary to bias the first and second valves toward the cam member, the operational force of the actuator can be made smaller. In other words, the first and second valves can be slowly operated with smaller driving force.

According to another feature of the invention, for example, as defined in the claim 14, the turbocharger has two valves, which are operated by one actuator and a cam member, wherein the actuator and the cam member are fixed to such a member (for example, a compressor housing a center housing and so on) which is different from a turbine housing. Namely, the actuator as well as the cam member is arranged in a low temperature atmosphere.

Since the cam member is arranged in the low temperature atmosphere, it is possible to avoid such a situation that the cam member may be deformed by heat from the turbine housing and that a clearance may be generated at an engaging point between the cam member and a link member.

As a result that the generation of the clearance can be avoided, it is possible to prevent malfunction of the independent two valves and deterioration of the accuracy for controlling the opening degrees of the valves. Accordingly, a reliability of the turbocharger, in which the two valves are operated by one actuator, can be increased.

BRIEF DESCRIPTION OF THE DRAWINGS

The above and other objects, features and advantages of the present invention will become more apparent from the following detailed description made with reference to the accompanying drawings. In the drawings:

FIGS. 9A to 9C are schematic cross sectional views respectively showing a relevant portion of the turbocharger;

FIGS. 9D to 9F are schematic side views respectively showing a valve link mechanism, respectively corresponding to valve conditions of FIGS. 9A to 9C;

DETAILED DESCRIPTION OF THE PREFERRED EMBODIMENTS

The present invention will be explained with reference to the drawings.

First Embodiment

Figure 1:
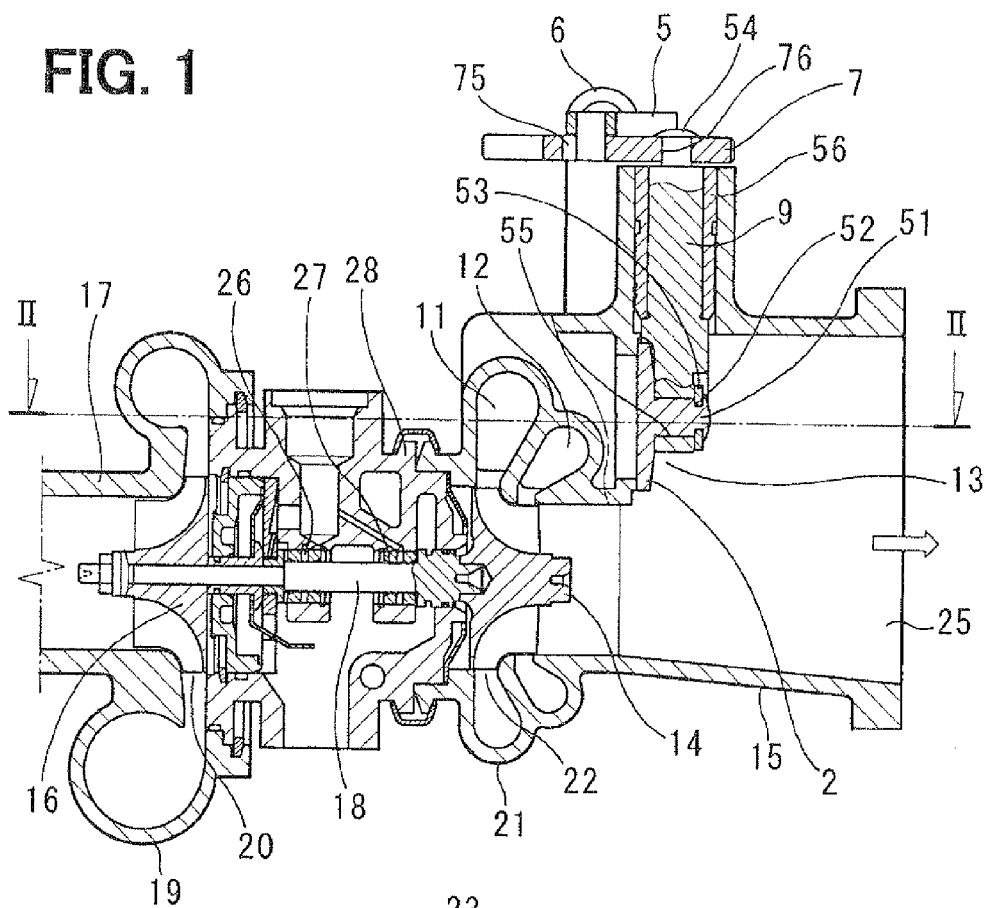
FIG. 1 is a schematic cross sectional view showing a supercharging pressure control apparatus for an internal combustion engine according to a first embodiment of the present invention.
Figure 2:
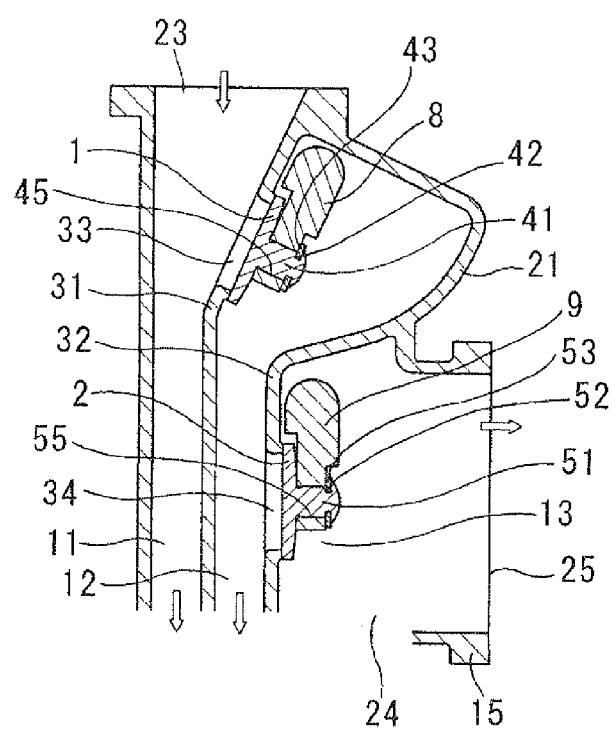
FIG. 2 is a schematic cross sectional view showing a relevant portion taken along a line II-II in FIG. 1.

FIGS. 1 to 6 show a first embodiment of the present invention, wherein FIGS. 1 and 2 show a supercharging pressure control apparatus for an internal combustion engine.

A control apparatus for the engine (an engine control system) according to the present embodiment is composed of a supercharging pressure control apparatus for controlling supercharging pressure of the engine and an electronic engine control unit (ECU) for controlling an operation of the supercharging pressure control apparatus. The control apparatus of the present embodiment is used as an exhaust gas control apparatus for the engine for controlling exhaust gas discharged from combustion chambers of respective cylinders.

As shown in FIGS. 1 to 5 (5A and 5B), the supercharging pressure control apparatus is composed of a turbocharger for supercharging intake air into combustion chambers of the respective cylinders of the engine and a valve driving device. The valve driving device has a flow rate control valve 1 (also referred to as a first valve) for opening and/or closing an exhaust gas flow-in passage (including a first and a second passage 11 and 12) of the turbocharger, a waste-gate valve 2 (also referred to as a second valve) for opening and/or closing a waste-gate passage (a bypass passage 13) of the turbocharger, and an actuator 3 (FIG. 3B) for driving (to rotate) the flow rate control valve 1 and the waste-gate valve 2.

The valve driving apparatus further has a valve interlocking mechanism for coupling the flow rate control valve 1 and the waste-gate valve 2 with each other so that they work together. The actuator 3 includes an electric motor which works as a driving source for the valve driving device.

Figure 3A:
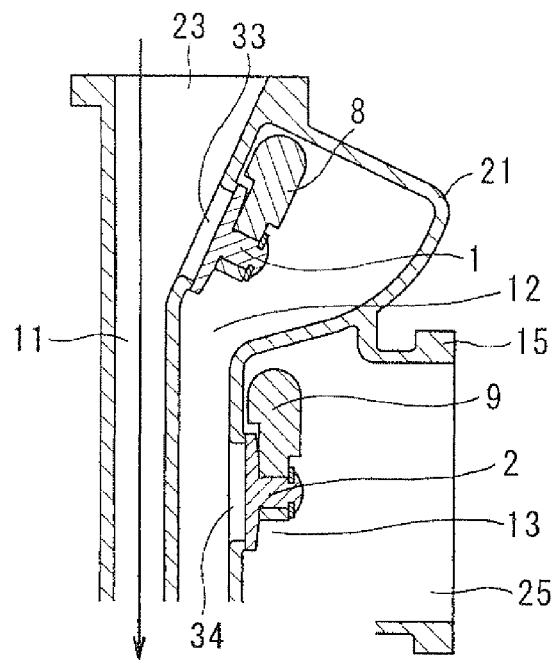
FIG. 3A is a schematic cross sectional view showing a relevant portion of a turbocharger in a valve condition (two valves 1 and 2 are closed)
Figure 3B:
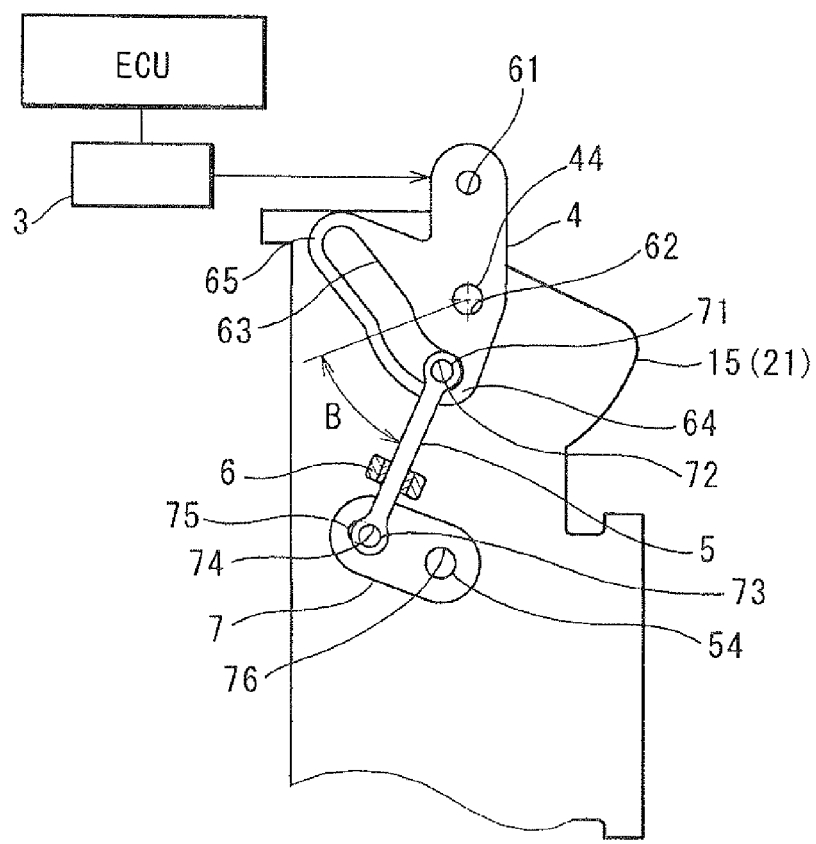
FIG. 3B is a schematic side view showing a valve link mechanism corresponding to the valve condition of FIG. 3A.

The valve interlocking mechanism (for example, as shown in FIG. 3B) is composed of a cam plate 4 (also referred to as a cam member), a link mechanism and so on. The cam plate 4 independently drives the flow rate control valve 1 and the waste-gate valve 2 such that each of them is opened and/or closed independently from each other. The link mechanism couples the cam plate 4 and the waste-gate valve 2 with each other. The link mechanism is composed of a link lever 5 movable in a stroke direction (reciprocating in an axial direction of the link lever 5), a lever bearing 6 for movably supporting the link lever 5 so that the link lever 5 is able to reciprocate, a link arm 7 for coupling the link lever 5 to the waste-gate valve 2, and so on.

The actuator 3 is composed of a rod (not shown) movable in a reciprocating manner in an axial direction thereof so as to rotate the cam plate 4, the electric motor (not shown) for generating a driving force upon receiving electric power, a speed reduction mechanism (not shown) for reducing the rotational speed of the electric motor, a conversion mechanism (not shown) for converting a rotational movement of the speed reduction mechanism into a reciprocating movement of the rod, and so on. An operation for controlling the opening degree of the valve driving device will be explained below.

The ECU includes a well known micro computer, which is composed of a CPU for carrying out control processes and calculation processes, a memory device (ROM, RAM and so on) for storing control programs, control logics, various kinds of data and so on, a timer and so on. Output signals from various kinds of sensors (such as, an air-flow meter, a crank angle sensor, an acceleration sensor, a throttle sensor, a valve opening degree sensor (a cam rotational angle sensor), a supercharging pressure sensor, a vehicle speed sensor, and so on) are inputted into the micro computer after those output signals are converted by A/D converting circuits into digital signals.

The micro computer measures (calculates) an operational condition of the engine (engine operational information) based on the electrical output signals from the crank angle sensor, the valve opening degree sensor, the supercharging pressure sensor and so on, in order to use such calculated engine operational information for various kinds of engine controls (for example, a valve opening degree control of the flow rate control valve 1 and the waste-gate valve 2). An operation for controlling the opening degree of the flow rate control valve 1 and the waste-gate valve 2 will be explained below.

The present embodiment is applied to a multi-cylinder gasoline engine, which is mounted in an engine compartment of a vehicle together with the turbocharger. The present invention, however, should not be limited to the gasoline engine.

The engine has a cylinder block, in which multi cylinders are arranged in a line, and a cylinder head, in which multiple intake ports and multiple exhaust ports are formed.

In the cylinder block, multiple combustion chambers are formed in a cylinder arranging line. A piston, which is linked with a crank shaft via a connecting rod, is movably supported in each cylinder bore, which is formed in the respective cylinder of the cylinder block. The piston is movable in the cylinder bore in a reciprocating manner.

An intake pipe is connected to the cylinder head, so that intake air flows into the intake ports of the respective cylinders. A compressor of the turbocharger, an intercooler, a throttle valve, an intake manifold and so on are provided at an intermediate portion of the intake pipe.

An exhaust pipe is also connected to the cylinder head, so that exhaust gas flows out from the exhaust ports of the respective cylinders and flows through the exhaust pipe. An exhaust manifold, a turbine of the turbocharger, and so on are provided at an intermediate portion of the exhaust pipe.

Spark plugs are provided in the cylinder head, so that each forward end of the spark plug is exposed to the combustion chamber of the respective cylinders. Fuel injectors are also provided in the cylinder head, so that fuel is injected into each of the intake ports of the respective cylinders or directly into each combustion chamber at appropriate timings.

Each intake port of the respective cylinder is opened and closed by an intake valve. Each exhaust port of the respective cylinder is likewise opened and closed by an exhaust valve.

The turbocharger has the compressor and the turbine so as to compress the intake air and to supply such compressed air into the combustion chambers of the respective cylinders.

The turbine has a turbine wheel 14 and a turbine housing 15. The compressor has a compressor wheel 16 and a compressor housing 17.

In the turbocharger, when the turbine wheel 14 is rotated by the exhaust gas, the compressor wheel 16 is thereby rotated so as to compress the intake air.

The compressor wheel 16 has multiple compressor blades in a circumferential direction. The compressor wheel 16 is connected to the turbine wheel 14 via a turbine shaft 18, so that the compressor wheel 16 is directly driven by the turbine wheel 14.

The compressor housing 17 is so arranged to surround an outer periphery of the compressor wheel 16. A spiral compressor scroll 19 is formed in the compressor housing 17, in which no partitioning wall is provided so as to divide a fluid passage into multiple passages. A wheel accommodating chamber 20 is formed at a center of the compressor scroll 19 in order to rotatably accommodate the compressor wheel 16.

The turbine of the present embodiment is a twin-scroll type turbine, which has the turbine wheel 14 rotated by the exhaust gas from the engine and the turbine housing 15 surrounding an outer periphery of the turbine wheel 14.

The turbine wheel 14 has multiple turbine blades in a circumferential direction. The turbine wheel 14 is connected to the compressor wheel 16 via the turbine shaft 18 so as to directly drive the compressor wheel 16.

A spiral turbine scroll 21 is formed in the turbine housing 15, in which a partitioning wall is provided so as to divide a fluid passage into multiple passages. A wheel accommodating chamber 22 is formed at a center of the turbine scroll 21 in order to rotatably accommodate the turbine wheel 14.

The exhaust gas flow-in passage is formed in the turbine scroll 21 in order to supply the exhaust gas from the engine into the wheel accommodating chamber 22. The exhaust gas flow-in passage of the turbine scroll 21 is divided into two passages (the first and second passages 11 and 12) in a rotational direction of the turbine wheel 14.

The turbine scroll 21 has an inlet port (inlet portion) 23 at a position, which is an upstream side of the wheel accommodating chamber 22 in a flow direction of the exhaust gas.

An inlet portion of the wheel accommodating chamber 22 is respectively communicated to the first and second passages 11 and 12 via a first and a second nozzle, while an outlet portion of the wheel accommodating chamber 22 is communicated to an exhaust gas flow-out passage 24.

The turbine housing 15 has an outlet port (outlet portion) 25 at such a position, which is a downstream side of the wheel accommodating chamber 22 in the flow direction of the exhaust gas.

The inlet port 23 is an exhaust gas inlet port, which is opened in a tangential direction of the wheel accommodating chamber 22 and connected to the exhaust manifold of the engine.

The outlet port 25 is an exhaust gas discharging port, which is extending in the center of the wheel accommodating chamber 22 and opened at one end in a direction of a rotational shaft of the turbine wheel 14. The outlet port 25 is connected to an exhaust pipe, in which an exhaust gas purifying device and a muffler are provided.

According to the present embodiment, the turbine housing 15 is connected to the compressor housing 17 via a bearing housing 28 (also referred to as a center housing), which holds bearings 26 and 27 for rotatably supporting the turbine shaft 18. In the turbine housing 15, the exhaust gas flow-out passage 24 for guiding the exhaust gas of the engine from the wheel accommodating chamber 22 to the outlet port 25 as well as the bypass passage 13 is formed, so that the exhaust gas from the engine bypasses the wheel accommodating chamber 22 and flows to the outlet port 25 through the exhaust gas flow-out passage 24.

A first partitioning wall 31 is provided in the turbine housing 15 so as to define the first and the second passage 11 and 12. In addition, a second partitioning wall 32 is provided in the turbine housing 15 so as to separate the bypass passage 13 from the first and second passages 11 and 12.

A first branch-out portion is formed in the turbine scroll 21, so that the second passage 12 is branched out from the first passage 11. A second, branch-out portion is further formed in the turbine scroll 21 so as to branch out the bypass passage 13 from the first and second passages 11 and 12 (in particular, from the second passage 12).

The first branch-out portion has a first valve port 33 and an annular valve seat (a first valve seat) surrounding the first valve port 33. The first valve seat is projected from a second passage side of the first partitioning wall 31 toward the flow rate control valve 1, so that a seating portion of the flow rate control valve 1 is seated on or separated from the annular valve seat (the first valve seat). As a result, the first valve port 33 is opened and/or closed by the flow rate control valve 1.

The first valve port 33 passes through the first partitioning wall 31 so as to communicate the first and second passages 11 and 12 with each other. The first valve port 33 is also referred to as a first communication through-hole, an opening area of which is controlled by the flow rate control valve 1.

In a similar manner, the second branch-out portion has a second valve port 34 and an annular valve seat (a second valve seat) surrounding the second valve port 34. The second valve seat is projected from a bypass passage side of the second partitioning wall 32 toward the waste-gate valve 2, so that a seating portion of the waste-gate valve 2 is seated on or separated from the annular valve seat (the second valve seat). As a result, the second valve port 34 is opened and/or closed by the waste-gate valve 2.

The second valve port 34 passes through the second partitioning wall 32 so as to communicate the first and second passages 11 and 12 (in particular, the second passage 12) with the bypass passage 13. The second valve port 34 is also referred to as a second communication through-hole, an opening area of which is controlled by the waste-gate valve 2.

Both of the first and second passages 11 and 12 guide the exhaust gas from the engine to the turbine wheel 14 so as to rotate the turbine wheel 14 by the force of the exhaust gas. As explained above, the first and second passages 11 and 12 form the exhaust gas flow-in passage. The first and second passages 11 and 12 are separated from each other by the first partitioning wall 31. The first passage 11 forms a first spiral scroll portion, while the second passage 12 forms a second spiral scroll portion.

The first passage 11 is communicated to the respective combustion chambers and the exhaust ports via the exhaust manifold and the inlet port 23. The first passage 11 forms a first exhaust gas flow-in passage for guiding the exhaust gas from, the inlet port 23 to the wheel accommodating chamber 22.

The second passage 12 is communicated with the first passage 11 via the first communication through-hole (the first valve port) 33. The second passage 12 forms a second exhaust gas flow-in passage for guiding the exhaust gas from the first communication through-hole 33 (the first branch-out portion) to the wheel accommodating chamber 22.

The bypass passage 13 is communicated with the second passage 12 via the second communication through-hole 34. The bypass passage 13 forms the waste-gate passage so that the exhaust gas from the second passage 12 bypasses the wheel accommodating chamber 22 and the exhaust gas is guided to the exhaust gas flow-out passage 24 and to the outlet port 25.

The bypass passage 13 may be so formed that the passage is communicated to the combustion chambers of the respective cylinders via the inlet port 23 and the exhaust gas from the inlet port 23 bypasses the wheel accommodating chamber 22.

In a case that an amount of the exhaust gas is increased, a flow resistance may be increased when all of the exhaust gas is guided to the turbine wheel 14. Therefore, in such a case, the waste-gate valve 2 is opened (the bypass passage 13 is opened) so that a part of the exhaust gas bypasses the wheel accommodating chamber and such exhaust gas is discharged into the air.

The flow rate control valve 1 is a first flow rate control valve, which is opened and/or closed to control amounts of the exhaust gases respectively flowing through the first and second passages 11 and 12. The flow rate control valve 1 is seated on or separated from the first valve seat formed in the first partitioning wall 31, to thereby close and/or open the first communication through-hole 33 (i.e. the first valve port 33). In addition, the flow rate control valve continuously changes the opening area of the first communication through-hole 33 to control the flow rates of the exhaust gases respectively flowing through the first and second passages 11 and 12.

Figure 6A:
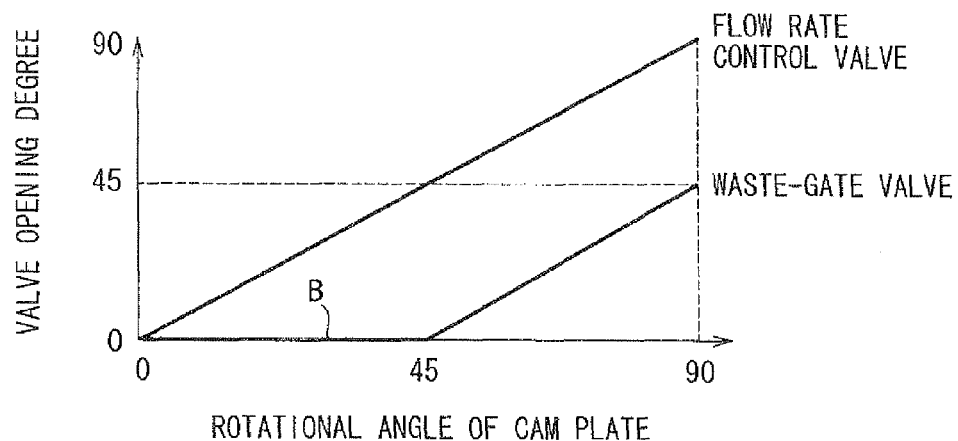
FIG. 6A is a graph showing characteristic lines of respective valves for a valve opening degree with respect to a cam rotational angle.

As shown in FIG. 6A, when the rotational angle of the cam plate 4 is changed from its minimum value (for example, 0°) to its maximum value (for example, 90°), the valve opening degree of the flow rate control valve 1 is continuously changed from its fully closed valve position (for example, 0°) to its fully opened valve position (for example, 90°).

Figure 6B:
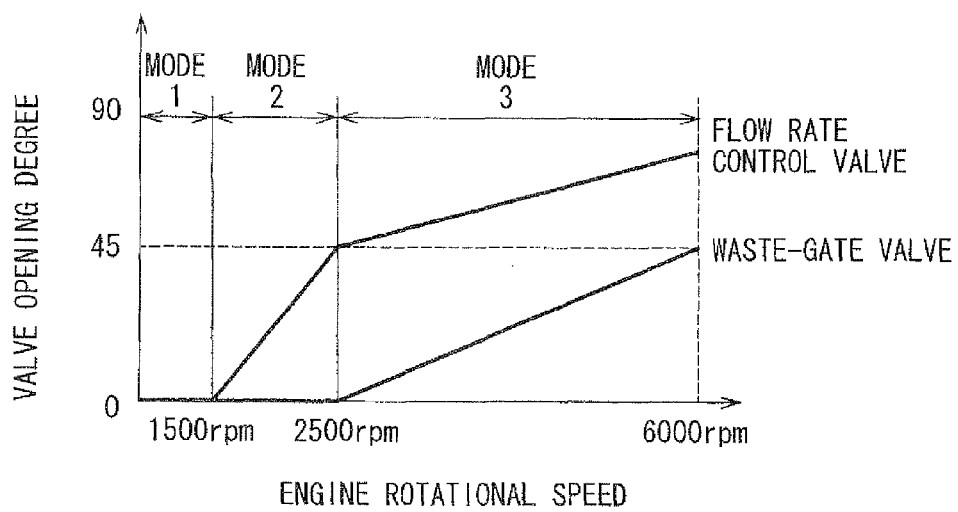
FIG. 6B is a graph showing characteristic lines of respective valves for the valve opening degree with respect to an engine rotational speed.

As shown in FIG. 6B, the flow rate control valve 1 is in the valve closed position when the engine is running at a low speed. The flow rate control valve 1 is opened when the engine is running at a middle speed and its opening degree is changed from its valve closed position to a valve half-open position as the engine rotational speed is changed from the low speed to the middle speed. When the engine rotational speed is further increased, the opening degree of the flow rate control valve 1 is correspondingly increased from the valve half-open position to the valve full opened position.

The flow rate control valve 1 is supported by one end of a valve arm 8. The flow rate control valve 1 is composed of a disc-shaped sealing member for opening and/or closing the first communication through-hole 33 and a projecting portion 41 projecting from a side surface of the disc-shaped sealing member.

A circular groove 42 is formed at an outer circumferential periphery of the projecting portion 41. A stopper element 43 (such as, a washer, a C-ring and so on) is provided in the circular groove 42 for preventing the valve arm 8 from being disassembled from the flow rate control valve 1, when the projecting portion 41 is inserted into the valve arm 8.

The valve arm 8 has an input portion at its other end coupled to the cam plate 4 and an output portion at the one end thereof connected to the flow rate control valve 1. A hinge pin 44 (for example, as shown in FIG. 3B), which is fixed to a first driving portion of the cam plate 4, is integrally formed with (or integrally fixed to) the input portion of the valve arm 8. An insertion through-hole 45, through which the projecting portion 41 of the flow rate control valve 1 is inserted, is formed at the output portion of the valve arm 8. The valve arm 8 is rotatably supported by the turbine housing 15 by a bearing (not shown).

The waste-gate valve 2 is a second flow rate control valve, which is opened and/or closed to control amount of the exhaust gas flowing through the bypass passage 13. The waste-gate valve 2 is seated on or separated from the second valve seat formed in the second partitioning wall 32, to thereby close and/or open the second communication through-hole 34 (the second valve port 34). In addition, the waste-gate valve 2 continuously changes the opening area of the second communication through-hole 34 to thereby control the flow rate of the exhaust gas flowing through the bypass passage 13.

As shown in FIG. 6A, the waste-gate valve 2 is kept in its valve closed position, when the rotational angle of the cam plate 4 is changed from its minimum value (for example, 0°) to an intermediate value (for example, 45°). In addition, the valve opening degree of the waste-gate valve 2 is continuously changed from its fully closed valve position (for example, 0°) to its fully opened valve position (for example, 45°), when the rotational angle of the cam plate 4 is changed from the intermediate value (for example, 45°) to the maximum value (for example, 90°).

As shown in FIG. 6B, the waste-gate valve 2 is in the valve closed position when the engine is running between the low speed and the middle speed. The waste-gate valve 2 is opened when the engine is running between the middle speed and high speed and its opening degree is changed from its valve closed position to a valve opened position as the engine rotational speed is changed from the middle speed to the high speed.

The waste-gate valve 2 is supported by one end of a valve arm 9. The waste-gate valve 2 is composed of a disc-shaped sealing member for opening and/or closing the second communication through-hole 34 and a projecting portion 51 projecting from a side surface of the disc-shaped sealing member.

A circular groove 52 is formed at an outer circumferential periphery of the projecting portion 51. A stopper element 53 (such as, a washer, a C-ring and so on) is provided in the circular groove 52 for preventing the valve arm 9 from being disassembled from the waste-gate valve 2, when the projecting portion 51 is inserted into the valve arm 9.

A hinge pin 54 (for example, as shown in FIG. 1 and FIG. 3B), which is fixed to the link arm 7, is integrally formed with (or integrally fixed to) an input portion of the valve arm 9. An insertion through-hole 55, through which the projecting portion 51 of the waste-gate valve 2 is inserted, is formed at an output portion of the valve arm 9. The valve arm 9 is rotatably supported by the turbine housing 15 by a bearing 56 (FIG. 1).

The valve driving device of the present embodiment will be explained with reference to FIGS. 1 to 5.

The valve driving device is composed of the actuator 3 for driving the rod (not shown) in the reciprocating manner in the stroke direction so as to rotate the cam plate 4 and the valve interlocking mechanism, which is operated depending on a moving amount (a stroke amount) of the rod in the stroke direction driven by the actuator 3.

The actuator 3 is composed of an electric actuator for driving the flow rate control valve 1 and the waste-gate valve 2 via the cam plate 4. The actuator 3 includes, in addition to the rod, the electric motor, the speed reduction mechanism and the conversion mechanism. The actuator 3 controls the valve opening and closing operations for the flow rate control valve 1 and the waste-gate valve 2. The rod of the actuator 3 straightly extends in the stroke direction. One end of the rod is connected to an output side of the conversion mechanism, while the other end thereof is connected to the input portion of the cam plate 4.

The electric motor is connected to a battery mounted in the vehicle via a motor driving circuit, which is electronically controlled by the ECU.

The valve interlocking mechanism is composed of the cam plate 4, the link lever 5, the lever bearing 6 and the link arm 7. The flow rate control valve 1 and the waste-gate valve 2 are interlocked with each other, so that the opening and closing operations for the flow rate control valve 1 and the waste-gate valve 2 are independently controlled.

The cam plate 4 is made of metal or resin and formed in a predetermined shape. The cam plate 4 is located at an outer side of the turbine housing 15. The cam plate 4 has one input portion and two (first and second) driving portions. The cam plate 4 is provided along the outer side surface of the turbine housing 15.

An insertion hole 61 is formed at the input portion of the cam plate 4. A hinge pin (not shown) fixed to a forward end of the rod of the actuator 3 is rotatably inserted into the insertion hole 61.

The cam plate 4 has a rotational axis which is coaxial with the hinge pin 44 (the rotational axis) of the valve arm 8 of the flow rate control valve 1.

The first driving portion of the cam plate 4 is a first output portion for rotating the flow rate control valve 1 in a synchronized manner with the rotation of the cam plate 4. The first driving portion has a direct connecting portion for directly connecting the cam plate 4 to the hinge pin 44 fixed to the valve arm 8 of the flow rate control valve 1, so that the flow rate control valve 1 and the cam plate 4 can integrally rotate as one unit. An insertion hole 62 is formed at the direct connecting portion (the first driving portion) of the cam plate 4, so that the hinge pin 44 of the valve arm 8 of the flow rate control valve 1 is inserted into the insertion hole 62.

The second driving portion of the cam plate 4 is a second output portion for rotating the waste-gate valve 2 in an operational pattern different from that of the flow rate control valve 1 when the cam plate 4 is rotated. The second driving portion has a guide portion (a cam groove) 63 having such a shape corresponding to the operational pattern of the waste-gate valve 2.

The second driving portion of the cam plate 4 has a first stopper portion 64 at one end of the cam groove and a second stopper portion 65 at the other end of the cam groove. A groove wall of the cam groove 63 between the first and second stopper portions 64 and 65 has a predetermined cam profile, which corresponds to the operational pattern of the waste-gate valve 2 different from that of the flow rate control valve 1. As shown in FIGS. 3 to 6, the cam profile has a valve closing area (a basic arc area B, as shown in FIG. 3B and FIG. 6A) and a valve opening area.

The valve closing area (the basic arc area B), in which the waste-gate valve 2 is kept in the closed condition, corresponds to a rotational angle of the cam plate 4 between the minimum value (for example, 0°) and the intermediate value (for example, 45°). In other words, the waste-gate valve 2 is closed in the valve closing area, irrespectively of the opening and/or closing condition of the flow rate control valve 1. Namely, the valve closing area is such an area, in which the flow rate control valve 1 and the waste-gate valve 2 are not interlocked with each other.

On the other hand, the valve opening area, in which the opening degree of the waste-gate valve 2 as well as the flow rate control valve 1 is controlled, corresponds to a rotational angle of the cam plate 4 between the intermediate value (for example, 45)° and the maximum value (for example, 90°).

Namely, the valve opening area is such an area, in which the flow rate control valve 1 and the waste-gate valve 2 are interlocked with each other, so that the flow rate of the exhaust gas is controlled continuously or in a stepwise.

The link lever 5 of the valve driving device is made of metal or resin and formed in a predetermined shape. The link lever 5 is arranged at the outer side of the turbine housing 15. The link lever 5 has an input end and an output end. The link lever 5 is provided along the outer side surface of the turbine housing 15. The link lever 5 is movably supported by the lever bearing 6, so that the link lever 5 moves back and forth in its longitudinal direction.

An insertion hole 72, into which a pivot pin 71 is inserted, is formed at the input end of the link lever 5. A cam follower (not shown) is rotatably supported at an outer periphery of the pivot pin 71. The cam follower is movably inserted into the cam groove 63 of the cam plate 4. Another insertion hole 74, into which a hinge pin 73 is inserted, is formed at the output end of the link lever 5.

The lever bearing 6 is made of metal or resin and formed in a predetermined shape, and provided at the outer side surface of the turbine housing 15. A through-hole is formed in the lever bearing 6, so that the link lever 5 moves back and forth in its longitudinal direction. An inner peripheral surface of the through-hole (that is, a sliding surface in contact with the link lever 5) has a convex curved line in its cross section, wherein the curved line is projected toward a center axis of the through-hole at a middle portion in an axial direction of the through-hole. As a result, a smooth reciprocal movement of the link lever 5 through the lever bearing 6 is achieved.

The link arm 7 is made of metal or resin and formed in a predetermined shape, and provided at the outer side surface of the turbine housing 15. The link arm 7 has an input end and an output end.

An insertion hole 75 of a long-hole shape, into which the hinge pin 73 is movably inserted, is formed at the input end of the link arm 7. The insertion hole 75 is of the long-hole shape, such as an oval shape or an elliptical shape, so that the hinge pin 73 can be moved in a long-hole direction. According to the above structure, the movement of the link lever 5 in the reciprocal direction is transmitted to the link arm 7 without a clearance (such as a back-lash or a play), so that the reciprocal movement is converted into a rotational movement. Another insertion hole 76, into which hinge pin 54 is inserted, is formed at the output end of the link arm 7. The hinge pin 54 is connected to the valve arm 9 of the waste-gate valve 2.

An operation of the ECU for controlling the opening degrees of the flow rate control valve 1 and the waste-gate valve 2 will be explained with reference to FIGS. 1 to 6.

As explained above, the air-flow meter, the crank angle sensor, the acceleration sensor, the throttle sensor, the cam rotational angle sensor, the supercharging pressure sensor, the vehicle speed sensor and so on are connected to the ECU.

The crank angle sensor is a rotational angle detecting sensor for detecting a rotational angle of a crank shaft of the engine. The crank angle sensor has a pick-up coil for converting the rotational angle of the engine crank shaft into electrical signals, for example, outputting NE pulse signals for every 30° CA (the crank angle).

The ECU functions as a rotational speed detecting unit for detecting the rotational speed of the engine (the engine rotational speed: NE) by calculating periodical time of the NE pulse signals from the crank angle sensor.

The acceleration sensor is an engine load detecting means for detecting a pedal stroke amount of an acceleration pedal (an acceleration opening degree).

The throttle sensor is a sensor for detecting an opening degree of a throttle valve (this is also one of the engine load detecting means), which is operated based on an electric signal from the acceleration sensor. The throttle valve and the throttle sensor may not be mounted in an engine depending on a type thereof.

The cam rotational angle sensor is a sensor for detecting a rotational angle of the cam plate 4 (an actual cam angle), which corresponds to a valve opening degree of the flow rate control valve 1 (and the waste-gate valve 2). The cam rotational angle sensor includes a hall IC having a magnetic field detecting element of a contact-less type for detecting magnetic flux generated from a magnet fixed to the cam plate 4. The electric signal outputted from the hall IC is a voltage signal (an analog signal) corresponding to magnetic flux density crossing a magnetic flux sensing surface of the hall element.

The supercharging pressure sensor is a sensor for detecting supercharging pressure (intake air pressure) of the intake air supercharged into the engine.

The ECU decides a valve driving mode depending on an operational condition of the engine. The memory device of the micro computer has a function as a table memory device, which stores relationships between the engine rotational speed NE and the valve opening degree V1 of the flow rate control valve 1 as well as the relationship between the engine rotational speed NE and the valve opening degree V2 of the waste-gate valve 2 in a predetermined form (for example, in a form of a calculation expression, a map data for the characteristic lines, as shown in FIG. 6B). In other words, the memory device functions as the table memory device for setting the valve driving mode.

A mode 1 in FIG. 6B corresponds to a first valve driving mode in the engine operational condition of the low speed. A mode 2 in FIG. 6B corresponds to a second valve driving mode in the engine operational condition of the middle speed. And a mode 3 in FIG. 6B corresponds to a third valve driving mode in the engine operational condition of the high speed. The engine rotational speed, which corresponds to a knick-point for the valve opening degree, can be freely changed.

It may be alternatively possible to calculate a target value (a target cam angle) corresponding to the acceleration opening degree, the throttle opening degree or the engine rotational speed, and to control the power supply to the electric motor in a feedback control based on a variation between the target cam angle and an actual can angle (the rotational angle of the cam plate 4 detected by the cam rotational angle sensor), so that the actual cam angle coincides with the target cam angle. According to such an arrangement, a response of controlling the cam plate 4 can be improved, so that the rotational angle of the cam plate 4 can be more quickly controlled at the target cam angle.

In addition, it is also possible that the ECU calculates a target supercharging pressure corresponding to the target cam angle and controls the power supply to the electric motor in a feedback control based on a variation between the target supercharging pressure and an actual supercharging pressure detected by the supercharging pressure sensor, so that the actual supercharging pressure coincides with the target supercharging pressure. The target supercharging pressure may be calculated based on the acceleration opening degree and/or the engine rotational speed. According to such an arrangement, a response of controlling the supercharging pressure with respect to the target supercharging pressure can be improved.

An operation of the turbocharger of the present embodiment will be explained with reference to FIGS. 1 to 6.

In the engine operation of the low speed, for example, in the operational range of the engine rotational speed which is smaller than 1,500 rpm, the valve driving mode is set in the mode 1, as shown in FIG. 6B.

In the mode 1, since both of the flow rate control valve 1 and the waste-gate valve 2 are kept in their closed positions, the power supply to the electric motor of the actuator 3 is so controlled that the rotational angle of the cam plate 4 is maintained at its minimum value (for example, 0°), as shown in FIG. 6A.

Accordingly, each of the flow rate control valve 1 and the waste-gate valve 2 is maintained in its closed position, with the cam plate position of the minimum value. As a result, the second passage 12 and the bypass passage 13 of the turbine housing 15 closed by the respective valves 1 and 2, as shown in FIGS. 3A and 3B.

Therefore, all of the exhaust gas discharged from the engine flows into the first passage 11 via the inlet port 23 and is introduced into the wheel accommodating chamber 22 via the first nozzle. The exhaust gas is then emitted to the air from the outlet port 25 via the exhaust gas flow-out passage 24 of the turbine housing 15, after having rotated the turbine wheel 14.

On the other hand, the intake air sucked into the intake pipe is compressed by the compressor wheel 16, which is driven by the rotation of the turbine wheel 14, and thereby the intake air pressure (supercharging pressure) is increased. Such pressure-increased intake air is sucked into the engine.

Since a sufficiently high speed flow can be obtained even with a small amount of the exhaust gas, the supercharging pressure can be increased in the low speed engine operation.

In the engine operation of the middle speed, for example, in the operational range of the engine rotational speed which is between 1,500 rpm and 2,500 rpm, the valve driving mode is set in the mode 2, as shown in FIG. 6B.

In the mode 2, the opening degree of the flow rate control valve 1 is controlled depending on the change of the engine rotational speed (the target cam angle) or the target supercharging pressure, while the waste-gate valve 2 is still kept in its closed position. Therefore, as shown in FIG. 6A, the power supply to the electric motor of the actuator 3 is so controlled that the rotational angle of the cam plate 4 is moved to a target position between the minimum value (for example, 0°) and the intermediate value (45°).

Figure 4A:
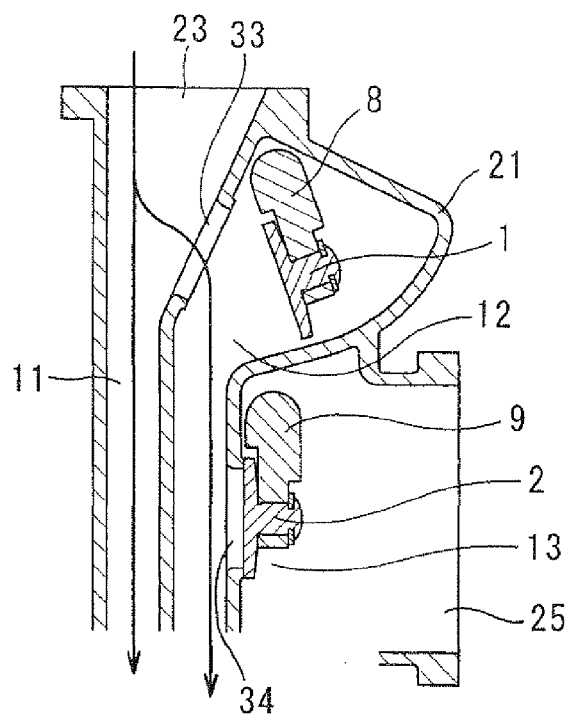
FIG. 4A is a schematic cross sectional view showing the relevant portion of the turbocharger in another valve condition (the valve 1 is opened, while the valve 2 is closed)
Figure 4B:
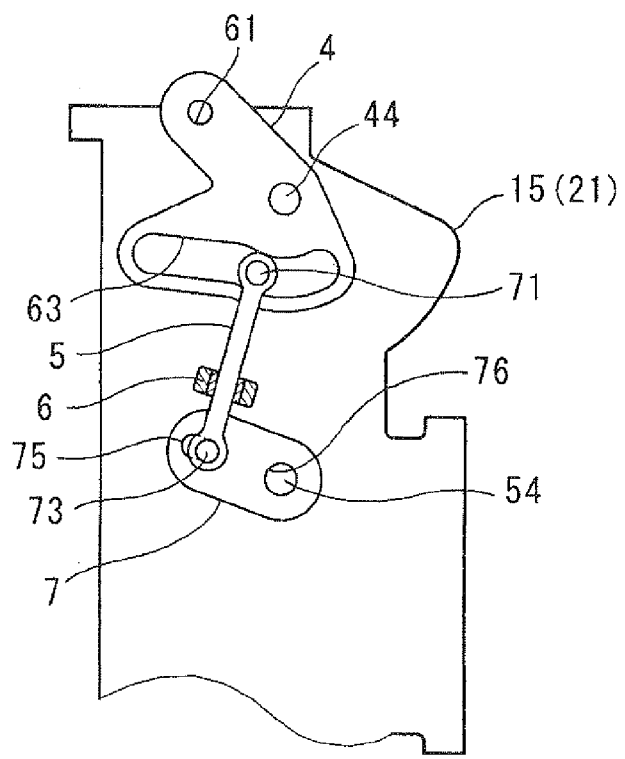
FIG. 4B is a schematic side view showing the valve link mechanism corresponding to the valve condition of FIG. 4A.

As a result, since the rotational angle of the cam plate 4 is changed to a predetermined value (a predetermined angle=the target position) between the minimum value and the intermediate value, the flow rate control valve 1 is opened by an angle corresponding to the engine rotational speed while the waste-gate valve 2 is maintained at its valve closed position, as shown in FIGS. 4A and 4B. The two passages (the first and second passages) 11 and 12 are opened, while the bypass passage 13 is still closed.

According to the above valve positions, a part of the exhaust gas discharged from the engine flows into the first passage 11 via the inlet port 23 and is introduced into the wheel accommodating chamber 22 via the first nozzle. The remaining part of the exhaust gas flows from the first passage 11 to the second passage 12 through the first communication through-hole 33, and such exhaust gas is introduced into the wheel accommodating chamber 22 via the second nozzle. The exhaust gases, which have been introduced into the wheel accommodating chamber 22 via the first and second passages 11 and 12, are then emitted to the air from the outlet port 25 via the exhaust gas flow-out passage 24 of the turbine housing 15, after having rotated the turbine wheel 14.

As in the same manner to that of the mode 1, the intake air sucked into the intake pipe is compressed by the compressor wheel 16, which is driven by the rotation of the turbine wheel 14, and thereby the intake air pressure (supercharging pressure) is increased. Such pressure-increased intake air is sucked into the engine.

Since the exhaust gas amount is increased, the supercharging pressure is correspondingly increased in the middle speed engine operation.

In addition, since the opening degree of the flow rate control valve 1 is controlled depending on the engine rotational speed (the target cam angle) or the target supercharging pressure, in other words, since the opening degree of the flow rate control valve 1 is increased as the engine rotational speed or the target supercharging pressure is increased, and since the flow rates of the exhaust gases respectively flowing through the first and second passages 11 and 12 are changed, the supercharging pressure for the engine can be optimized depending on the engine operational condition.

In the engine operation of the high speed, for example, in the operational range of the engine rotational speed which is higher than 2,500 rpm, the valve driving mode is set in the mode 3, as shown in FIG. 6B.

In the mode 3, the opening degree of the flow rate control valve 1 as well as the waste-gate valve 2 is controlled depending on the change of the engine rotational speed (the target cam angle) or the target supercharging pressure. Therefore, as shown in FIG. 6A, the power supply to the electric motor of the actuator 3 is so controlled that the rotational angle of the cam plate 4 is moved to a target position between the intermediate value (45°) and the maximum value (90°).

Figure 5A:
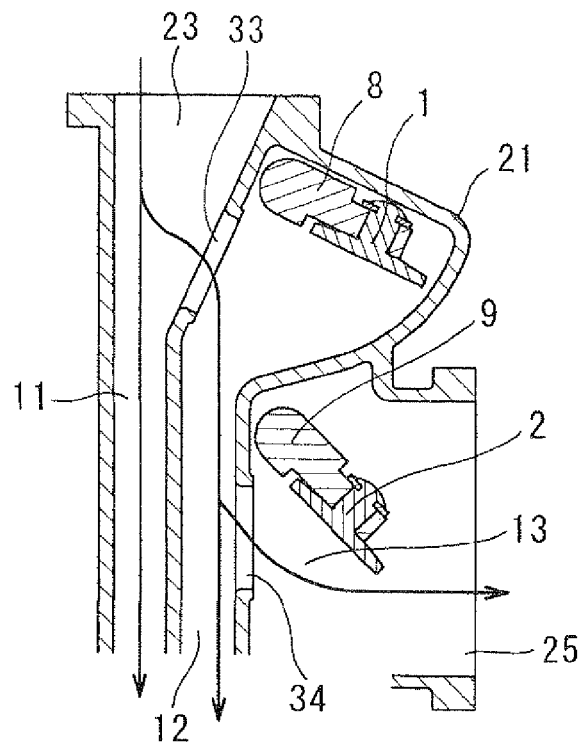
FIG. 5A is a schematic cross sectional view showing the relevant portion of the turbocharger in a further valve condition (the valves 1 and 2 are opened)
Figure 5B:
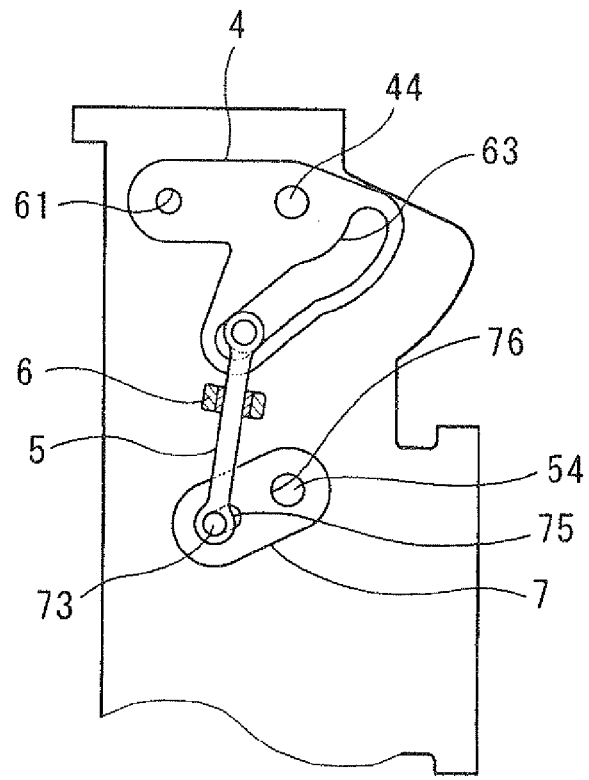
FIG. 5B is a schematic side view showing the valve link mechanism corresponding to the valve condition of FIG. 5A.

As a result, since the rotational angle of the cam plate 4 is changed to a predetermined value (a predetermined angle=the target position) between the intermediate value and the maximum value, the flow rate control valve 1 as well as the waste-gate valve 2 is opened by respective angles corresponding to the engine rotational speed, as shown in FIGS. 5A and 5B. Therefore, all of the two passages (the first and second passages) 11 and 12 and the bypass passage 13 are opened.

According to the above valve positions, a part of the exhaust gas discharged from the engine flows into the first and second passages 11 and 12 via the inlet port 23 and is introduced into the wheel accommodating chamber 22 via the first and second nozzles. The exhaust gases, which have been introduced into the wheel accommodating chamber 22 via the first and second passages 11 and 12, are then emitted to the air from the outlet port 25 via the exhaust gas flow-out passage 24 of the turbine housing 15, after having rotated the turbine wheel 14.

As in the same manner to that of the mode 1 or 2, the intake air sucked into the intake pipe is compressed by the compressor wheel 16, which is driven by the rotation of the turbine wheel 14, and thereby the intake air pressure (supercharging pressure) is increased. Such pressure-increased intake air is sucked into the engine.

The remaining part of the exhaust gas flows from the second passage 12 to the bypass passage 13 through the second communication through-hole 34, so that such remaining exhaust gas bypasses the wheel accommodating chamber 22 and is emitted to the air from the outlet port 25. It is, thereby, possible to control the supercharging pressure which will not exceed a predetermined maximum supercharging pressure.

In addition, since the opening degree of the flow rate control valve 1 as well as the waste-gate valve 2 is controlled depending on the engine rotational speed (the target cam angle) or the target supercharging pressure, in other words, since the opening degree of the flow rate control valve 1 as well as the waste-gate valve 2 is increased as the engine rotational speed or the target supercharging pressure is increased, and since the flow rates of the exhaust gases respectively flowing through the first and second passages 11 and 12 and also through the bypass passage 13 are changed, the supercharging pressure for the engine can be optimized depending on the engine operational condition.

As explained above, according to the supercharging pressure control apparatus of the present embodiment, the valve driving mode is changed depending on the engine operational condition.

In the low speed engine operation, the valve driving mode is set to the mode 1, in which both of the flow rate control valve 1 and the waste-gate valve 2 are closed. In this mode 1, the exhaust gas is introduced into the wheel accommodating chamber 22 only through the first passage 11.

In the middle speed engine operation, the valve driving mode is set to the mode 2, in which the flow rate control valve 1 is opened and its opening degree is controlled, while the waste-gate valve 2 is maintained in its valve closed position. In this mode 2, the exhaust gas is introduced into the wheel accommodating chamber 22 through both of the first and second passages 11 and 12.

In the high speed engine operation, the valve driving mode is set to the mode 3, in which both of the flow rate control valve 1 and the waste-gate valve 2 are opened and their opening degrees are respectively controlled. In this mode 3, the part of the exhaust gas is introduced into the wheel accommodating chamber 22 through both of the first and second passages 11 and 12, while the remaining exhaust gas flows through the bypass passage 13 so as to bypass the wheel accommodating chamber 22.

As above, since the opening degrees of the flow rate control valve 1 and the waste-gate valve 2 are respectively controlled depending on the engine operational condition (the engine rotational speed, the target cam angle, the target supercharging pressure, etc., it is possible to adjust the flow amounts of the exhaust gases respectively flowing through the first and second passages 11 and 12 as well as the bypass passage 13, so that the supercharging pressure is controlled.

In addition, it is possible to decrease exhaust gas pressure in the turbocharger in the high speed engine operation. It is, thereby, possible to prevent an over-rotation of the turbine wheel 14 and to prevent the supercharging pressure from becoming to an excessive value. In other words, the supercharging pressure is prevented from excessively increasing.

As a result, it is possible to improve efficiency of the turbocharger in a wide operational range of the engine from the low speed to the high speed operation. In other words, it is possible to optimize the supercharging pressure in the wide operational range of the engine, to thereby improve fuel consumption ratio.

According to the valve driving device of the present embodiment, which is mounted in the turbocharger, the flow rate control valve 1 and the waste-gate valve 2 are interlocked with each other but each of the valves is operated to open and/or close independently from each other.

As explained above, the valve driving device is composed of the actuator 3, the cam plate 4, the cam follower, the link lever 5, the link arm 7 and so on. The valve arm 8 of the flow rate control valve 1 and the valve arm 9 of the waste-gate valve 2 are respectively and operatively coupled to the output portion (the rod) of the actuator 3.

The rotational axis of the cam plate 4 is coaxially arranged with the hinge pin 44 for the valve arm 8 of the flow rate control valve 1. The cam plate 4, which is rotated in the rotational direction thereof by the driving force (the motor torque) of the actuator 3 around the rotational axis, has the first driving portion for rotating the flow rate control valve 1 in the synchronized manner with the rotation of the cam plate 4 and the second driving portion for rotating the waste-gate valve 2 in the operational pattern different from that of the flow rate control valve 1 when the cam plate 4 is rotated.

The second driving portion of the cam plate 4 has the cam groove (the cam profile) having the shape corresponding to the operational pattern of the waste-gate valve 2, which is different from that of the flow rate control valve 1.

The cam profile has the valve closing area (the basic arc area B), in which the valve closed condition of the waste-gate valve 2 is maintained even when the opening degree of the flow rate control valve 1 is controlled, and the valve opening area in which the opening degrees of the flow rate control valve 1 and the waste-gate valve 2 are controlled depending on the operational condition of the engine.

According to such a feature, it is possible to operate (open and/or close) the flow rate control valve 1 and the waste-gate valve 2 independently from each other, even in the case that the actuator for operating the flow rate control valve 1 and the waste-gate valve 2 is composed of one actuator 3.

As above, according to the supercharging pressure control apparatus of the present embodiment, since one actuator 3 is sufficient, it is possible to realize the improvement of easier mounting of the apparatus in the engine compartment of the vehicle, the light weight of the apparatus, and the cost-down of the apparatus.

The insertion hole 62 is provided at the first driving portion of the cam plate 4 so that the hinge pin 44 of the valve arm 8 of the flow rate control valve 1 is inserted into the insertion hole 62. Since it is possible to suppress the clearance (such as the play, the back-lash and so on) between the first driving portion of the cam plate 4 and the flow rate control valve 1, clattering of the flow rate control valve 1 can be reduced and control accuracy for the flow rates of the exhaust gases flowing through the first and second passages 11 and 12 can be increased.

The cam groove 63, into which the cam follower supported by the pivot pin 71 of the link lever 5 is movably inserted, is formed at the second driving portion of the cam plate 4. The lever bearing 6 is provided for movably supporting the link lever 5. The insertion hole 75 of the long-hole shape, into which the hinge pin 73 rotatably supported at the output end of the link lever 5 is movably inserted, is formed at the input end of the link arm 7. In addition, the hinge pin 54 fixed to the valve arm 9 of the waste-gate valve 2 is fitted into the output end of the link arm 7.

According to such a structure, it is possible to reduce the clearance (the play, the back-lash and so on) between the second driving portion of the cam plate 4 and the waste-gate valve 2, as much as possible. It is, therefore, the clattering is not generated when the waste-gate valve 2 is operated. Furthermore, it is possible to increase the control accuracy for the flow amount of the exhaust gas flowing through the bypass passage 13.

It is not necessary to provide any biasing means for biasing the flow rate control valve 1 and the waste-gate valve 2 toward the cam plate 4. The weight of the valve driving device (in particular, the actuator 3) can be reduced. Namely, it is possible to slowly operate the flow rate control valve 1 as well as the waste-gate valve 2 with a smaller driving force.

According to the turbocharger of the present embodiment, the actuator 3, the cam plate 4, the link lever 5, the link arm 7 and other related parts are arranged at the outer surface of the turbine housing 15. According to such a structure, since the above mentioned actuator 3 and the other parts can be cooled down by the air (cooling air), it is possible to design heat resisting properties of the above parts and components (the actuators and so on) at lower values. In other words, it is possible to use metal and/or resin material, which are lower in heat resisting properties and lower in cost, for the above mentioned parts and components (the actuators and so on).

It is possible to estimate the actual opening degrees of the flow rate control valve 1 and the waste-gate valve 2 based on the actual cam angle (the rotational angle of the cam plate 4) detected by the cam angle sensor. It is, then, further possible to estimate flow amounts of the exhaust gases respectively flowing through the first and second passages 11 and 12 as well as the bypass passage 13, based on the estimated values of the valve opening degrees for the flow rate control valve 1 and the waste-gate valve 2. And then, it is possible to estimate the rotational speed of the turbine wheel 14, based on the estimated values for the respective flow amounts of the exhaust gases flowing through the first and second passages 11 and 12 as well as the bypass passage 13. And finally, it is possible to estimate the supercharging pressure for the engine based on the estimated values for the rotational speed of the turbine wheel 14.

The estimated value for the supercharging pressure may be set as the target supercharging pressure and the power supply to the electric motor may be controlled in the feedback control based on the variation between the actual supercharging pressure and the target supercharging pressure, so that the actual supercharging pressure detected by the supercharging pressure sensor will coincide with the target supercharging pressure. In such a case, since it is possible to reduce control error caused by product variation, it is possible to control the opening degrees of the flow rate control valve 1 and the waste-gate valve 2 with higher accuracy. Then, the optimum valve operation can be realized depending on the operational condition of the engine. It is, therefore, possible to realize the optimum supercharging pressure and exhaust gas pressure depending on the engine operational condition, to thereby improve the fuel consumption ratio.

The product variation may include, for example, individual difference of the turbocharger, the individual difference of the electric motor, the individual difference of the valve interlocking mechanism, measuring errors of the cam angle sensor (variation of the sensor outputs), errors in estimated values, and so on.

According to the present embodiment, the rod for rotating the cam plate 4 around its rotational axis is moved in the axial direction (the stroke direction) by use of the driving force of the electric motor, and then the waste-gate valve 2 is moved (rotated) by the reciprocal movement of the link lever 5. Instead of the electric motor, the rod may be operated (moved in the stroke direction) by electromagnetic force or by hydraulic pressure. In addition, the rotational movement of the actuator may be transmitted to the cam plate 4 without converting the rotational movement into the reciprocal movement of the rod.

The present embodiment may be applied to not only the gasoline engine but also diesel engine.

Second Embodiment

A second embodiment of the present invention will be explained with reference to FIGS. 7 to 12. The same reference numerals to the first embodiment are used in the second embodiment for designating the same or similar parts or portions.

Figure 7:
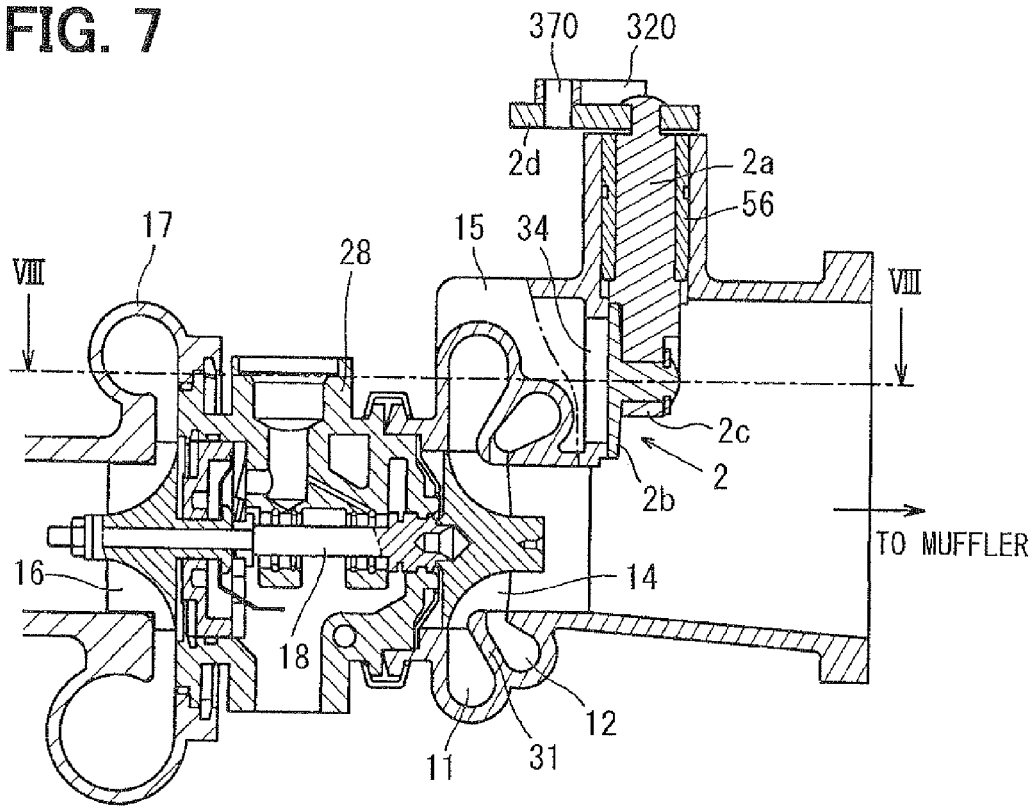
FIG. 7 is a schematic cross sectional view showing a supercharging pressure control apparatus (a turbocharger) according to a second embodiment of the present invention.
Figure 8:
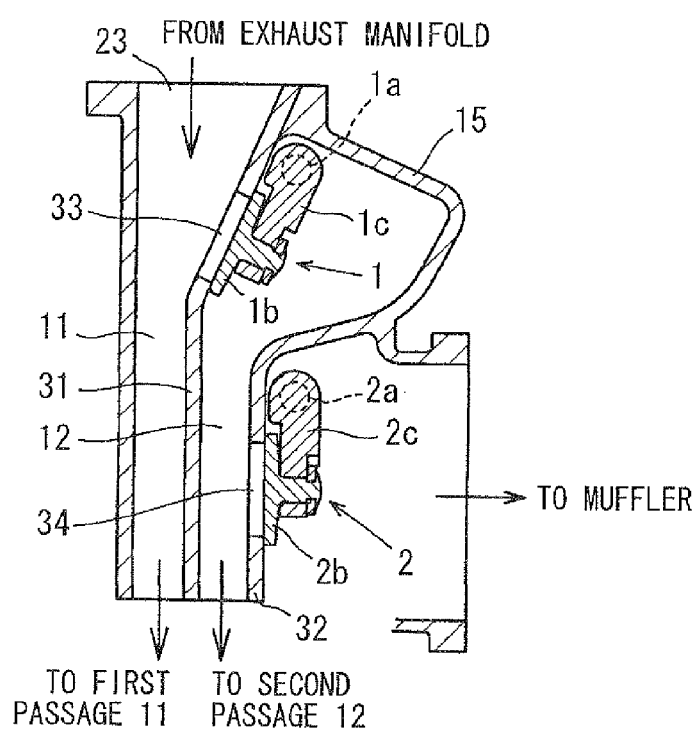
FIG. 8 is a schematic cross sectional view showing a relevant portion taken along a line VIII-VIII in FIG. 7.

As already explained in the first embodiment, the turbocharger for the engine is composed of (as shown in FIGS. 7 and 8);

the turbine wheel 14 rotated by the exhaust gas from the engine;
the turbine housing 15 formed in a spiral shape for accommodating the turbine wheel 14;
the compressor wheel 16 driven by the rotational force of the turbine wheel 14 so as to compress the intake air;
the compressor housing 17 of a spiral shape for accommodating the compressor wheel 16;
the turbine shaft 18 for transmitting the rotational force of the turbine wheel 14 to the compressor wheel 16; and
the bearing housing (also referred to as the center housing) 28 for rotatably supporting the turbine shaft 18.

The center housing 28 is arranged between the turbine housing 15 and the compressor housing 17 and those housings 15, 17 and 28 are connected to each other by stud bolts or the like.

The turbocharger is of the variable capacitor type. The inside of the turbine housing 15 is divided by the partitioning wall 31 so as to define the first and second passages 11 and 12 (also referred to as a first scroll passage 11 and a second scroll passage 12), as shown in FIGS. 7 and 8.

The first and second scroll passages 11 and 12 are formed at an outer periphery of the turbine wheel 14 so as to supply the exhaust gas to the turbine wheel 14.

As shown in FIG. 8, the partitioning wall 31 extends to the inlet port 23 of the turbine housing 15 for the exhaust gas (that is, a position close to an exhaust manifold of the engine), so that an upstream end of the first scroll passage 11 is always in communication with the inlet port 23 for the exhaust gas.

As shown in FIG. 8, an upstream portion of the first scroll passage 11 is gradually restricted by the partitioning wall 31 along a downstream direction.

The first valve port (that is, the first communication through-hole) 33 is formed in the partitioning wall 31, which forms the above restricted portion. The first scroll passage 11 is operatively communicated to the second scroll passage 12 via the first valve port 33.

The first valve port 33 is opened and/or closed by the flow rate control valve 1. When the flow rate control valve 1 controls the opening degree of the first valve port 33, the amount of the exhaust gas flowing through the second scroll passage 12 toward the turbine wheel 14 is controlled. The passage area for the exhaust gas flowing toward the turbine wheel 14 can be controlled depending on the opening degree of the flow rate control valve 1.

The flow rate valve 1 is rotated by rotation of a first valve shaft 1a, which is rotatably supported by the turbine housing 15 so as to control the passage area of the first valve port 33. The flow rate control valve 1 is composed of a first valve body 1b for directly opening or closing the first valve port 33, a first inside arm 1c provided in the inside of the turbine housing 15 for connecting the first valve body 1b to the first valve shaft 1a, and a first outside arm 1d (FIGS. 9D to 9F) provided at an outside of the turbine housing 15 and connected to the first valve shaft 1a so that the first outside arm 1d is integrally rotated with the first valve shaft 1a.

According to the above structure, the opening degree of the flow rate control valve 1 (i.e. the passage area of the first valve port 33) is controlled by the first valve body 1b, when the first outside arm 1d is operated to rotate. As a result, the amount of the exhaust gas flowing through the second scroll passage 12 toward the turbine wheel 14 is controlled.

According to the present embodiment, the first valve shaft 1a and the first inside arm 1c are formed as one member.

The waste-gate communication hole 34 (also referred to as the second valve port or the second communication through-hole) is formed at the second partitioning wall 32, so that a part of the exhaust gas flowing through the second scroll passage 12 flows through the waste-gate communication hole 34 when the waste-gate communication hole 34 is opened by the waste-gate valve 2. As a result, such part of the exhaust gas bypasses the turbine wheel 14 and flows toward a muffler provided in the exhaust pipe.

The amount of the exhaust gas bypassing the turbine wheel 14 is controlled when the passage area of the waste-gate communication hole 34 is controlled by the waste-gate valve 2.

The waste-gate valve 2 has a similar structure to that of the flow rate control valve 1.

The waste-gate valve 2 is rotated by rotation of a second valve shaft 2a, which is rotatably supported by the turbine housing 15 so as to control the passage area of the second valve port 34. The waste-gate valve 2 is composed of a second valve body 2b for directly opening or closing the second valve port 34, a second inside arm 2c provided in the inside of the turbine housing 15 for connecting the second valve body 2b to the second valve shaft 2a, and a second outside arm 2d (FIGS. 9D to 9F) provided at the outside of the turbine housing 15 and connected to the second valve shaft 2a so that the second outside arm 2d is integrally rotated with the second valve shaft 2a.

According to the above structure, the passage area of the second valve port 34 is controlled by the second valve body 2b, when the second outside arm 2d is operated to rotate. As a result, the amount of the exhaust gas flowing through the second valve port 34 (namely, bypassing the turbine wheel 14) is controlled.

According to the present embodiment, the second valve shaft 2a and the second inside arm 2c are formed as one member.

According to the present embodiment, the first valve shaft 1a and the second valve shaft 2a are arranged in parallel to each other.

The first and second valve shafts 1a and 2a are rotatably supported by bearing portions (tubular bearing bushes) 56, so that leakage of the exhaust gas from the inside of the turbine housing 15 to the outside may not occur.

According to the present embodiment, return springs (not shown) are respectively provided for returning the flow rate control valve 1 and the waste-gate valve 2 to their initial positions.

A return spring is provided for returning the opening degree of the flow rate control valve 1 to its initial position, that is a valve closing position at which the first valve port (the first communication through-hole) 33 is closed.

In a similar manner, another return spring is provided for returning the opening degree of the waste-gate valve 2 to its initial position, that is a valve closing position at which the second valve port (the second communication through-hole) 34 is closed.

The above flow rate control valve 1 as well as the waste-gate valve 2 is driven by one electric actuator 3. More exactly, the flow rate control valve 1 and the waste-gate valve 2 are operated by one electric actuator 3 and the link device, which converts the output torque of the electric actuator 3 and transmits such torque to the flow rate control valve 1 and the waste-gate valve 2, respectively.

The electric actuator 3 is composed of the electric motor (for example, a DC motor) and the reduction gear (for example, a reduction gear device), which reduces rotational output from the electric motor to thereby increase the output torque, so that the electric actuator 3 generates the rotational output depending on the electric power supplied to the electric motor.

The electric actuator 3 of the present embodiment does not have a return spring.

Although the electric actuator 3 does not have the return spring, an output shaft thereof can be returned to its initial position, because the restoring forces of the respective return springs for the flow rate control valve 1 and the waste-gate valve 2 are transmitted to the electric actuator 3 via the link device 30 (FIGS. 9D to 9F).

A return spring having a small restoring force, however, may be provided in the electric actuator 3, so that the restoring force is generated to return the output shaft of the electric actuator to its initial position.

An operation of the electric actuator 3 is explained below:

(i) When the power supply to the electric motor is increased so as to increase the output torque thereof, the rotational angle of the output shaft of the electric actuator is increased against the biasing forces of the return springs.

(ii) When the power supply to the electric motor is decreased so as to decrease the output torque thereof, the rotational angle of the output shaft of the electric actuator is decreased by the biasing forces of the return springs.

(iii) When the power supply to the electric motor is cut off, the rotational angle of the output shaft of the electric actuator is returned to its initial position (that is, a position at which the rotational angle is 0°) by the biasing forces of the return springs.

The electric actuator 3 has a rotational angle sensor (not shown) for detecting the rotational angle of the output shaft thereof. The rotational angle sensor may be of a contact-less type using a magnetometric sensor and so on, or may be of a contact type using a potentiometer or the like.

The output of the rotational angle sensor is supplied to the ECU (not shown) for controlling the opening degrees of the flow rate control valve 1 and the waste-gate valve 2, wherein the power supply to the electric actuator 3 is controlled.

The link device 30 will be explained with reference to FIGS. 9A to 9F and FIG. 10.

According to the present embodiment, the electric actuator 3 and the cam plate 4 fixed to the output shaft of the electric actuator 3 are arranged at such positions separated from the turbine housing 15.

More exactly, the electric actuator 3 and the cam plate 4 are located at such positions separated from the turbine housing 15, which are in low-temperature atmosphere. The electric actuator 3 is attached to the compressor housing 17 (or the center housing 28) by means of a mounting stay (not shown).

The parts and/or components, to which the electric actuator 3 and the can plate 4 are fixed, should not be limited to the compressor housing 17 or the center housing 28. The electric actuator 3 and the cam plate 4 may be arranged in any positions, so long as such positions are in the low-temperature atmosphere.

As above, since the electric actuator 3 and the cam plate 4 are located in the positions, which are separated from the turbine housing 15, the link device 30 is composed of;

a first link member 310 for connecting the cam plate 4 (which is arranged in the low-temperature atmosphere) to the first outside arm 1d (which rotates the flow rate control valve 1 and which is arranged in a high-temperature atmosphere); and a second link member 320 for connecting the cam plate 4 (which is arranged in the low-temperature atmosphere) to the second outside arm 2d (which rotates the waste-gate valve 2 and which is arranged in a high-temperature atmosphere).

The cam plate 4 is formed in a plate shape and made of such material having high heat resisting properties and high wear resisting properties (for example, metal or resin material). The cam plate 4 is fixed to the output shaft of the electric actuator 3 at a right angle thereto. A reference numeral 4a in FIG. 10 designates a shaft insertion through-hole having two flat opposing surfaces, which is formed in the cam plate 4. The output shaft of the electric actuator 3 is inserted into the shaft insertion through-hole 4a, so that the cam plate 4 is rotated together with the output shaft of the electric actuator 3.

The cam plate 4 has a cam groove 63 for driving the flow rate control valve 1 and the waste-gate valve 2.

Figure 10:
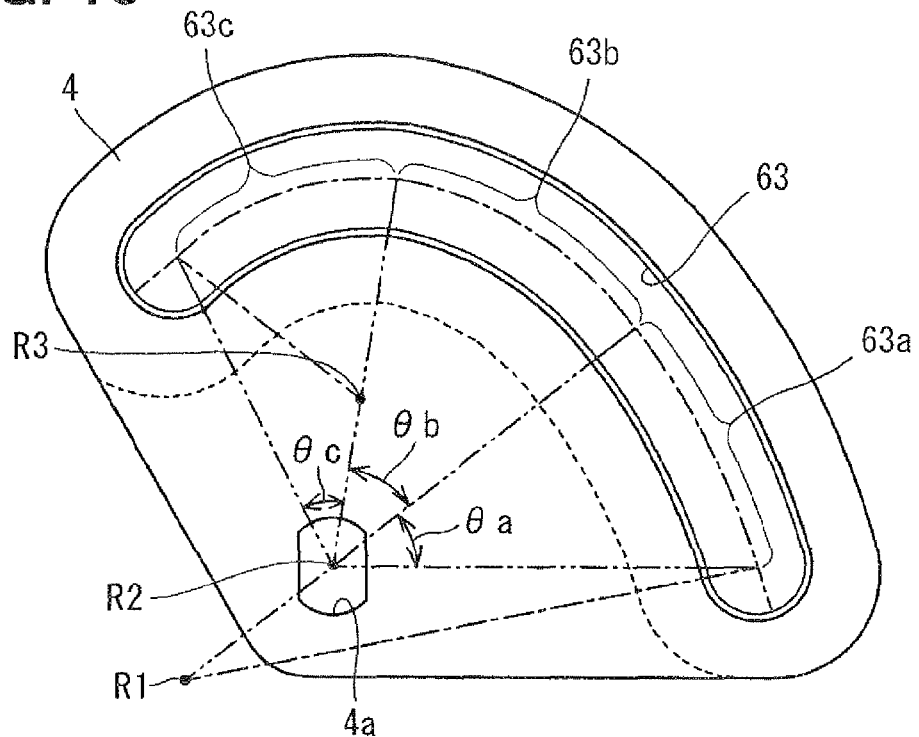
FIG. 10 is schematic plane view of a cam plate.

As shown in FIG. 10, the cam groove 63 has;

(i) a first cam groove area 63a for driving only the first link member 310 (that is, the flow rate control valve 1);

(ii) a second cam groove area 63b for idling the first and second link members 310 and 320 (namely, driving neither the flow rate control valve 1 nor the waste-gate valve 2); and (iii) a third cam groove area 63c for driving only the second link member 320 (that is, the waste-gate valve 2).

The above first to third cam groove areas 63a to 63c (corresponding to respective rotational angles of the cam plate 4) will be explained.

The first and second link members 310 and 320 are rod-shape members and arranged in a V-letter location, so that a rotational center of the cam plate 4 is located at such a position at which elongations of the first and second link members 310 and 320 cross each other, in FIGS. 9D to 9F.

According to the present embodiment, the cam groove 63 has the second cam groove area 63b between the first and third cam groove areas 63a and 63c. In addition, when an angle between the first and second link members 310 and 320 is expressed by "X" (FIG. 9D), (i) a rotational angle "θa" for the first cam groove area 63a is made equal to or smaller than "X";

(ii) a rotational angle "θb" for the second cam groove area 63b is made equal to or larger than "X"; and (iii) a rotational angle "θc" for the third cam groove area 63c is made equal to or smaller than "X".

According to the above structure of the cam plate 4 (the cam groove 63), such an operational area, in which the flow rate control valve 1 and the waste-gate valve 2 are operated at the same time, is eliminated.

Examples for the above angles "X", "θa", "θb" and "θc" are as below:

the angle "X" between the first and second link members 310 and 320 is "38°";

the rotational angle "θa" for the first cam groove area 63a is "38°";

the rotational angle "θb" for the second cam groove area 63b is "40°"; and the rotational angle "θc" for the third cam groove area 63c is "35°".

The rotational angular range of the cam plate 4 covers such an area, in which a second roller 360 (an engaging point between the second link member 320 and the cam groove 63) can move from a boundary between the first and second cam groove areas 63a and 63b to a left-hand end of the third cam groove area 63c. In other words, the rotational angular range of the cam plate 4 corresponds to the second and third cam groove areas 63b and 63c (40°+35°).

The cam groove 63 will be further explained hereinafter.

The cam groove 63 has a large arc portion, a concentric arc portion and a small arc portion, which are continuously connected to each other.

The large arc portion corresponds to the first cam groove area 63a and is continuously connected to one end of the concentric arc portion. A curvature radius of the large arc portion (63a) is larger than that of the concentric arc portion (63b). A center point of the large arc portion is indicated by R1 in FIG. 10.

The concentric arc portion corresponds to the second cam groove area 63b and also corresponds to such an arc portion having a center point, which is identical to a rotational center of the cam plate 4. The center point of the concentric arc portion is indicated by R2 in FIG. 10.

The small arc portion corresponds to the third cam groove area 63c and is continuously connected to the other end of the concentric arc portion (63b). A curvature radius of the small arc portion (63c) is smaller than that of the concentric arc portion (63b). A center point of the small arc portion is indicated by R3 in FIG. 10.

The first link member 310 is formed in a rod shape for operatively coupling the cam groove 63 of the cam plate 4 with the first outside arm 1d. The first link member 310 is a rod member made of such material having high heat resisting properties and high wear resisting properties (for example, metal or resin material).

The first link member 310 is movably supported by a guide member (not shown), so that it moves in its longitudinal direction in a reciprocating manner.

More exactly, the first link member 310 moves in a direction, which coincides with a line connecting the rotational center of the cam plate 4 to an engaging point (a first arm engaging point) 350 between the first link member 310 and the first outside arm 1d (FIG. 9D).

A first roller 340 is provided at one end of the first link member 310 (on a side of the cam plate 4), so that the first roller 340 is engaged with the cam groove 63.

The first arm engaging point 350 is formed at the other end of the first link member 310 (on a side of the first outside arm 1d). The first arm engaging point 350 is rotatably linked with one end of the first outside arm 1d, which is separated from the rotational center (the first valve shaft 1a) of the flow rate control valve 1.

When the cam plate 4 is rotated in a clockwise direction (the cam groove 63 is displaced), the first roller 340 is moved in a direction closer to the rotational center of the cam plate 4. Then, the first link member 310 is displaced toward the rotational center of the cam plate 4, so that the flow rate control valve 1 is rotated in a valve opening direction (FIG. 9).

On the other hand, when the cam plate 4 is rotated in an anti-clockwise direction, the first roller 340 is moved in a direction separated from the rotational center of the cam plate 4. Then, the first link member 310 is also displaced in the direction away from the rotational center of the can plate 4, so that the flow rate control valve 1 is rotated in a valve closing direction (FIG. 9D).

The second link member 320 is likewise formed in a rod shape for operatively coupling the cam groove 63 of the cam plate 4 with the second outside arm 2d. The second link member 320 is a rod member made of such material having high heat resisting properties and high wear resisting properties (for example, metal or resin material).

The second link member 320 is also movably supported by a guide member (not shown), so that it moves in its longitudinal direction in a reciprocating manner.

More exactly, the second link member 320 moves in a direction, which coincides with a line connecting the rotational center of the cam plate 4 to an engaging point (a second arm engaging point) 370 between the second link member 320 and the second outside arm 2d (FIG. 9D).

In a similar manner to the first link member 310, the second roller 360 is provided at one end of the second link member 320 (on the side of the cam plate 4), so that the second roller 360 is engaged with the cam groove 63.

The second arm engaging point 370 is formed at the other end of the second link member 320 (on a side of the second outside arm 2d). The second arm engaging point 370 is rotatably linked with one end of the second outside arm 2d, which is separated from the rotational center (the second valve shaft 2a) of the waste-gate valve 2.

In a similar manner to the first link member 310, when the cam plate 4 is rotated in the clockwise direction (the cam groove 63 is displaced), the second roller 360 is moved in the direction closer to the rotational center of the cam plate 4. Then, the second link member 320 is displaced toward the rotational center of the cam plate 4, so that the waste-gate valve 2 is rotated in a valve opening direction (FIG. 9F).

On the other hand, when the cam plate 4 is rotated in the anti-clockwise direction, the second roller 360 is moved in the direction separated from the rotational center of the cam plate 4. Then, the second link member 320 is also displaced in the direction away from the rotational center of the cam plate 4, so that the waste-gate valve 2 is rotated in a valve closing direction (FIG. 9E).

A relationship between the valve opening degrees of the flow rate control valve 1 and the waste-gate valve 2 with respect to the rotational angle of the output shaft of the electric actuator 3 (that is, the rotational angle of the cam plate 4) will be explained with reference to FIG. 11.

According to the present embodiment, the electric actuator 3 as well as the cam plate 4 rotates within the angular range between 0° and 75° (that is, a sum of the angular range of the second cam groove area 63b(40°) and the third cam groove area 63c)(35°). In FIG. 11, a solid line A designates the opening degree of the flow rate control valve 1, while a solid line B designates the opening degree of the waste-gate valve 2.

(Operation when the Rotational Angle of the Cam Plate 4 is "0°")

As shown in FIGS. 9A and 9D, when no electric power is supplied to the electric actuator 3, each of the first outside arm 1d (the first inside arm 1c) and the second outside arm 2d (the second inside arm 2c) is biased in the valve closing direction by the respective return springs for the flow rate control valve 1 and the waste-gate valve 2. Therefore, the first and second valve ports (the first and second communication through-holes) 33 and 34 are respectively closed by the flow rate control valve 1 and the waste-gate valve 2.

As a result, all of the exhaust gas, which flows from the exhaust manifold into the turbine housing 15, flows through the first scroll passage 11. The turbine wheel 14 is thereby driven to rotate by the exhaust gas flowing only through the first scroll passage 11.

(Operation when the Rotational Angle of the Cam Plate 4 is Between "0°" and "38°")

When the electric power is supplied to the electric actuator 3 so as to rotate the cam plate 4, and when the rotational angle of the cam plate 4 is smaller than "38°", the first roller 340 for driving the flow rate control valve 1 moves only within the area of the large arc portion (that is, the first cam groove area 63a), and the second roller 360 for driving the waste-gate valve 2 moves within the area of the concentric arc portion (that is, the second cam groove area 63b).

Figure 11:
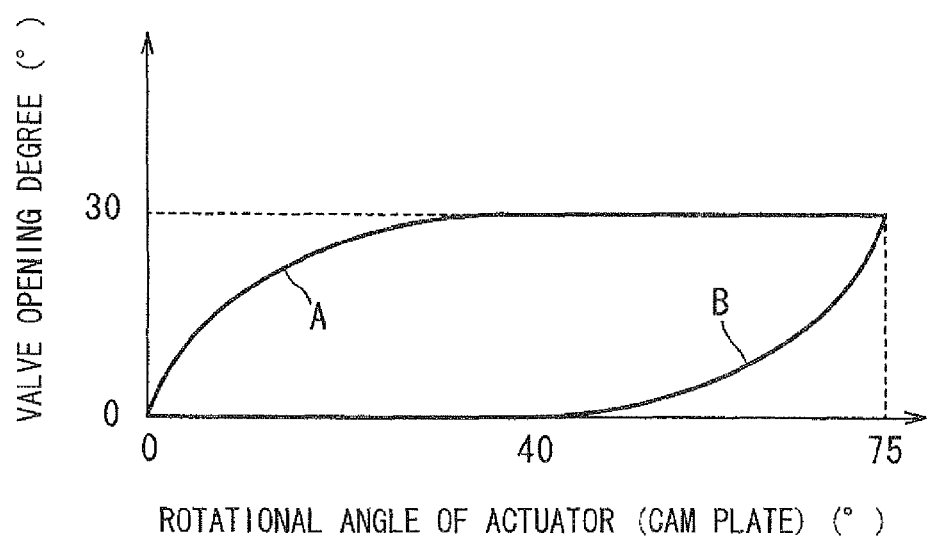
FIG. 11 is a graph showing characteristic lines of respective valves for a valve opening degree with respect to a cam rotational angle.

According to the above operation, the opening degree of the flow rate control valve 1 is increased as the rotational angle of the cam plate 4 is increased, while the waste-gate valve 2 is maintained in its valve closed condition, when the cam plate 4 is moved in the range smaller than "38°", as shown in FIG. 11.

In other words, it is possible to control the opening degree of the flow rate control valve 1 depending on the rotation of the cam plate 4, while the second valve port (the second communication through-hole) 34 is closed by the waste-gate valve 2, when the rotational angle of the cam plate 4 is smaller than "38°".

As above, the exhaust gas flowing from the exhaust manifold into the turbine housing 15 flows through the first scroll passage 11 and the amount of the exhaust gas flowing through the second scroll passage 12 is controlled by the opening degree of the flow rate control valve 1.

Accordingly, the exhaust gas pressure for driving the turbine wheel 14 can be controlled by the rotation of the cam plate 4.

(Operation when the Rotational Angle of the Cam Plate 4 is Between "38°" and "40°")

When the rotational angle of the cam plate 4 is between "38°" and "40°", not only the first roller 340 for the flow rate control valve 1 but also the second roller 360 for the waste-gate valve 2 moves within the area of the concentric arc portion (that is, the second cam groove area 63b).

As a result, the flow rate control valve 1 is maintained in its full opened condition (the opening degree is 30°), while the waste-gate valve 2 is maintained in its valve closed condition.

(Operation when the Rotational Angle of the Cam Plate 4 is Between "40°" and "75°")

When the rotational angle of the cam plate 4 is larger than "40°",
the first roller 340 for driving the flow rate control valve 1 moves within the area of the concentric arc portion (that is, the second cam groove area 63b), and
the second roller 360 for driving the waste-gate valve 2 moves within the area of the small arc portion (that is, the third cam groove area 63c).

According to the above operation, the opening degree of the waste-gate valve 2 is increased as the rotational angle of the cam plate 4 is increased, while the flow rate control valve 1 is maintained in its valve full opened condition (the opening degree thereof is "30°"), when the cam plate 4 is moved in the range larger than "40°", as shown in FIG. 11.

In other words, it is possible to control the opening degree of the waste-gate valve 2 depending on the rotation of the cam plate 4, while the flow rate control valve 1 is maintained in its valve full opened condition, when the rotational angle of the cam plate 4 is larger than "40°".

As a result, while the exhaust gas flowing from the exhaust manifold into the turbine housing 15 flows through the first and second scroll passages 11 and 12, the amount of such exhaust gas bypassing the turbine wheel 14 is controlled by the opening degree of the waste-gate valve 2.

Figure 12:
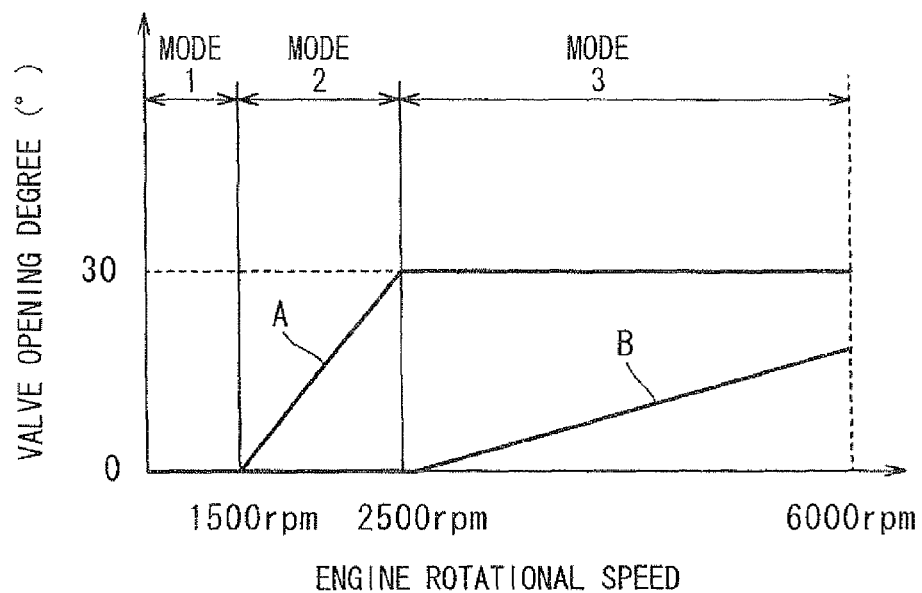
FIG. 12 is a graph showing characteristic lines of respective valves for the valve opening degree with respect to an engine rotational speed.
Figure 13:
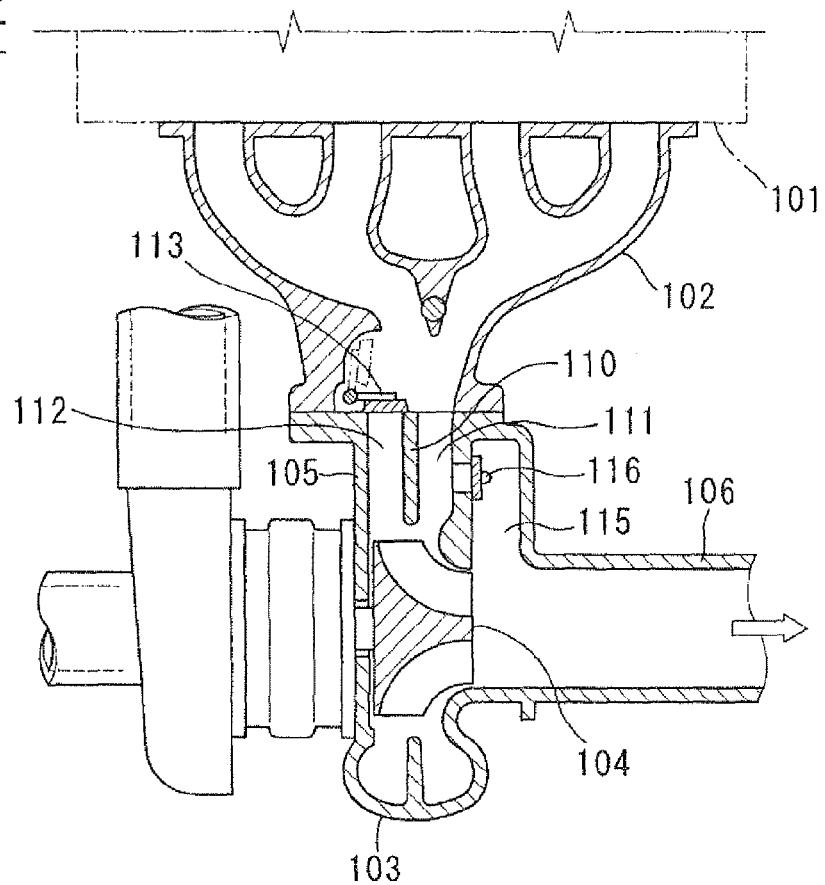
FIG. 13 is a schematic cross section view in part showing a supercharging pressure control apparatus according to one of prior arts.
Figure 14:
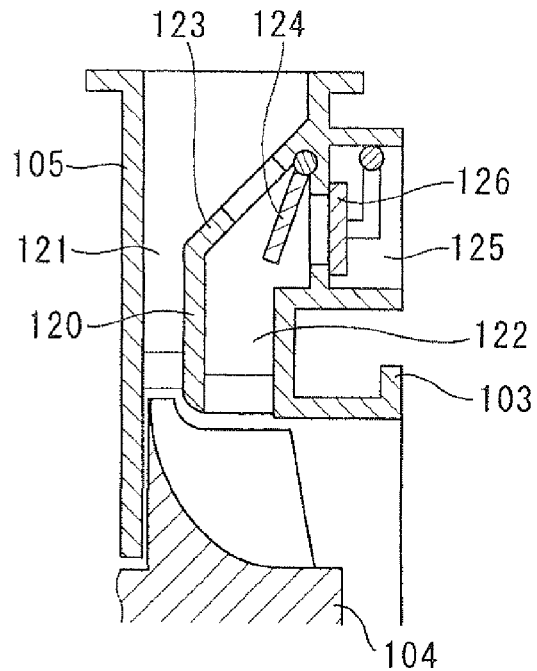
FIG. 14 is a schematic cross section view showing a relevant portion of an exhaust gas pressure control apparatus according to another prior art.
Figure 15A:
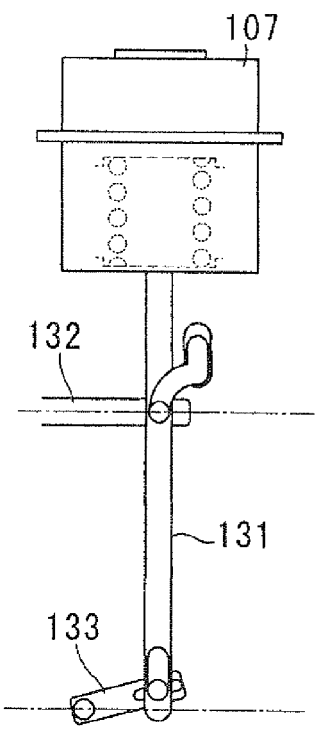
FIGS. 15A to 15C are schematic views showing a link mechanism of a further prior art for an actuator rod connected to a driving shaft for a variable nozzle and a driving shaft for a waste-gate valve.
Figure 15B:
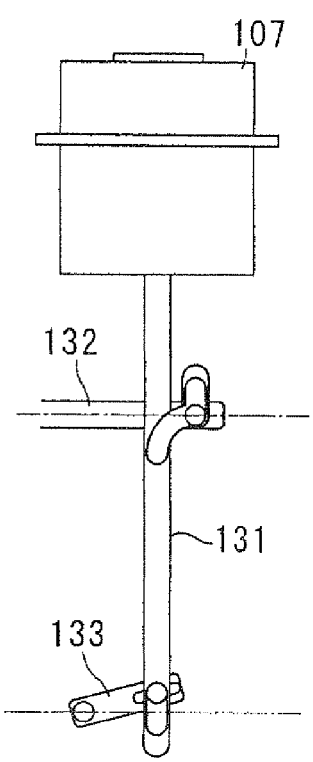
Figure 15C:
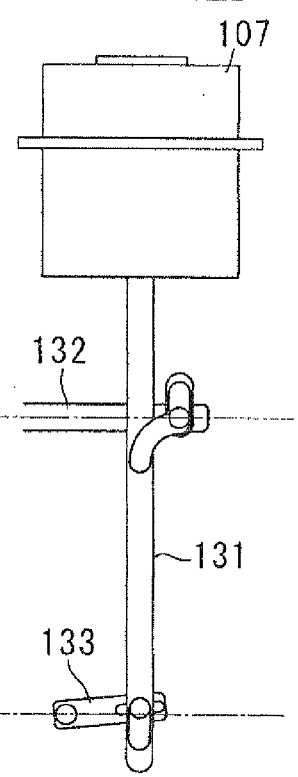
Figure 16:
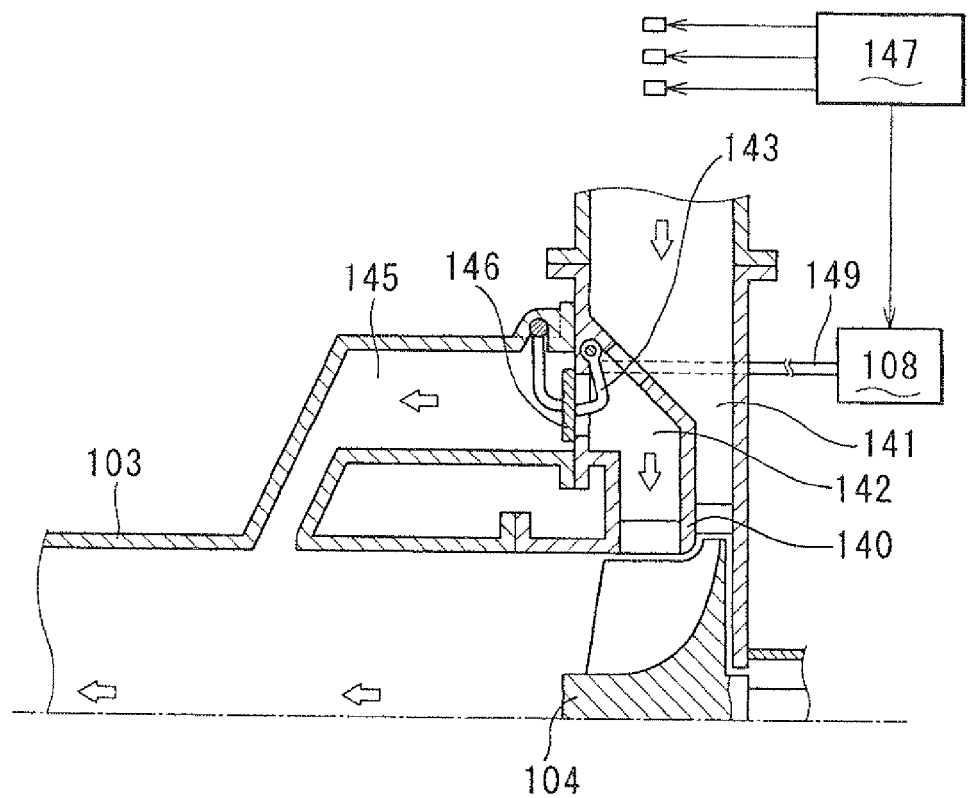
FIG. 16 a schematic cross section view showing a supercharging pressure control apparatus according to a further prior art.

An operation of the electric actuator 3 controlled by the ECU will be explained with reference to FIG. 12. In FIG. 12, a solid line A designates the opening degree of the flow rate control valve 1, while a solid line B designates the opening degree of the waste-gate valve 2.

The ECU carries out one of the following three operational modes depending on the operational condition of the vehicle.
 a first mode (a mode 1), in which the first and second valve ports 33 and 34 are respectively closed by the flow rate control valve 1 and the waste-gate valve 2 (corresponding to FIGS. 9A and 9D),
 a second mode (a mode 2), in which the opening degree of the first valve port 33 is controlled by the flow rate control valve 1, while the second valve port 34 is closed (corresponding to FIGS. 9B and 9E), and
 a third mode (a mode 3), in which the opening degree of the second valve port 34 is controlled by the waste-gate valve 2, while the first valve port 33 is maintained in its full opened condition (corresponding to FIGS. 9C and 9F).

The ECU calculates a target torque based on the engine rotational speed and the engine load (the opening degree of the acceleration pedal). Then, the ECU calculates a target intake air amount based on the engine rotational speed and the target torque, and further calculates a target supercharging pressure based on the target intake air amount. Finally, the ECU calculates a target opening degree of the flow rate control valve 1 based on the target supercharging pressure and the engine rotational speed.

The power supply amount to the electric actuator 3 is feed-back controlled based on the detected values of the rotational angle sensor, so that the target opening degree of the flow rate control valve 1 is achieved.

At least one of the sensor signals from the supercharging pressure sensor (for detecting the intake air pressure compressed by the compressor turbine) and the exhaust gas pressure sensor (for detecting the exhaust gas pressure at the inlet portion of the turbine wheel 14) is inputted to the ECU.

The power supply amount to the electric actuator 3 is also feed-back controlled based on the detected values of the supercharging pressure sensor, so that the supercharging pressure detected by the supercharging pressure sensor does not exceed a predetermined value. Alternatively, the power supply amount to the electric actuator 3 is likewise feed-back controlled based on the detected values of the exhaust gas pressure sensor, so that the exhaust gas pressure detected by the exhaust gas pressure sensor does not exceed a predetermined value.

The ECU gives preference to the control for the opening degree of the waste-gate valve 2 over the control for the opening degree of the flow rate control valve 1.

Advantages of the Second Embodiment

The present embodiment has the following advantages:
(1) The flow rate control valve 1 and the waste-gate valve 2, which are operated depending on different operational factors, are driven by one electric actuator 3. It is, therefore, possible to reduce the cost, when compared with the case in which independent two actuators are provided for respectively driving the flow rate control valve 1 and the waste-gate valve 2.

(2) The electric actuator 3 and the cam plate 4 are attached to the compressor housing 17 (or to the center housing 28), which is different from the turbine housing 15, so as to locate the electric actuator 3 and the cam plate 4 in the low-temperature atmosphere.

As a result, it is not necessary to increase the heat resisting property of the electric actuator 3, to thereby reduce the cost of the electric actuator.

(3) Since the cam plate 4 is located in the low-temperature atmosphere, it is possible to avoid such a case that the cam plate may be deformed as a result that the cam plate is exposed to high temperature. It is further possible to avoid such an unfavorable situation that a clearance is generated at the engaging point between the cam plate 4 and the first link member 310 and at the engaging point between the cam plate 4 and the second link member 320.

As above, since the generation of the clearance can be avoided, it is possible to avoid malfunction of the operation and/or deterioration of the accuracy for controlling the opening degrees of the flow rate control valve 1 and the waste-gate valve 2.

As a result, reliability of the turbocharger, in which the flow rate control valve 1 and the waste-gate valve 2 are controlled by one electric actuator, can be increased.

(4) The return springs are provided in each of the flow rate control valve 1 and the waste-gate valve 2 in order to bring the valve opening degree to the initial condition.

In each of the valves, the biasing force is applied so as to return the valve to its valve closed position.

Accordingly, it is possible to avoid such an unfavorable situation that the flow rate control valve 1 as well as the waste-gate valve 2 may be flip-flopped by pulsation of the exhaust gas, vibration of the engine, and so on.

(5) According to the present embodiment, the first and second link members 310 and 320 are engaged with the single can groove 63, so as to drive the flow rate control valve 1 and the waste-gate valve 2.

Therefore, it is possible to make the cam plate 4 smaller in size, to improve easy mounting of the apparatus to the vehicle, and to suppress the cost increase.

(6) According to the present embodiment, the concentric arc portion (the second cam groove area 63b) is formed in the middle of the cam groove 63. It is, thereby, possible to eliminate such an area in which the flow rate control valve 1 and the waste-gate valve 2 are operated at the same time.

More exactly, the respective cam groove areas are formed as below, wherein the angle formed between the first and second link members 310 and 320 is designated by "X":

(i) the rotational angle "θa" for the first cam groove area 63a is made equal to or smaller than "X";

(ii) the rotational angle "θb" for the second cam groove area 63b is made equal to or larger than "X"; and (iii) the rotational angle "θc" for the third cam groove area 63c is made equal to or smaller than "X".

According to the above structure of the cam plate 4 (the cam groove 63), such an operational area, in which the flow rate control valve 1 and the waste-gate valve 2 are operated at the same time, is eliminated.

As a result, it is possible to suppress the necessary driving force required for the electric actuator 3 and thereby make the electric actuator smaller in size.

(7) The cam groove 63 is formed by the large arc portion, the concentric arc portion and the small arc portion, wherein they are continuously connected to each other.

Since all portions of the cam groove 63 are formed by the arc portions, it is possible to form a smooth cam groove.

It is, thereby, possible to prevent any hanging-up by the cam groove 63 and to increase the reliability. In addition, it is possible to decrease the driving load for the electric actuator 3 to thereby make the actuator smaller in size.

Modifications

In the above embodiment, the cam profile for the first cam groove area 63a (for driving the flow rate control valve 1) is formed in the arc shape. However, the profile for the first cam groove area 63a should not be limited to the arc shape, but any other shape, such as, a straight shape, a sine-curve shape, and so on may be used.

In the above embodiment, the cam profile for the third cam groove area 63c (for driving the waste-gate valve 2) is formed in the arc shape. However, the profile for the third cam groove area 63c should not be limited to the arc shape, but any other shape, such as, a straight shape, a sine-curve shape, and so on may be likewise used.

In the above embodiment, such operational area, in which the two valves are not operated at the same time, is provided in order to reduce the driving load for the electric actuator 3. It may be, of course, possible to drive the two valves at the same time. For example, the cam profile of the cam groove 63 may be so made that the opening degree of the flow rate control valve 1 is further increased, when the opening degree of the waste-gate valve is increased.

In the above embodiment, the electric actuator 3 is used. However, any other types of the actuators, for example, a hydraulic actuator, a negative pressure actuator, and so on may be used.

In the above embodiment, the output shaft of the actuator 3 is directly fixed to the cam plate 4. However, it is possible to arrange the actuator 3 and the cam plate 4 at such positions separated from each other.

In the above embodiment, the cam plate 4 is rotated. However, the cam plate 4 may be moved in a linear direction.

When a hydraulic actuator or a negative pressure actuator is used as the actuator for the cam plate, or when the cam plate is operated by the electric actuator from a position away from the cam plate, the cam plate may be rotated or displaced in a sliding movement.

What is claimed is:

1. An exhaust gas control apparatus for an engine with a turbocharger comprising:

a turbine housing having a turbine accommodating chamber therein;

a turbine wheel movably supported in the turbine accommodating chamber and rotated by exhaust gas from the engine;

a first passage and a second passage formed in the turbine housing for introducing the exhaust gas from the engine into the wheel accommodating chamber, the first and second passages being formed by dividing an exhaust gas flow-in passage into two passages in a rotational direction of the turbine wheel;

a bypass passage formed in the turbine housing so that the exhaust gas from the engine flowing through the bypass passage bypasses the wheel accommodating chamber;

a first valve and a second valve, each of which is movably provided in the turbine housing so as to control flow amounts of exhaust gases respectively flowing through the first and second passages and the bypass passage by an opening and/or closing movements of the respective first and second valves;

a valve interlocking mechanism having a cam member for interlocking the first and second valves with each other so as to independently open and/or close the first and second valves from each other; and an actuator for driving the first and second valves by way of the cam member, wherein the cam member has a rotational axis rotatably supported by the turbine housing, a first driving portion formed at the rotational axis and directly couple to the first valve so that the first valve is rotated in a synchronized manner with rotation of the cam member, and a second driving portion having a cam groove coupled to the second valve so that the second valve is rotated in accordance with the rotation of the cam member and in an operational pattern different from that of the first valve, and wherein the exhaust gas control apparatus further comprises:

a cam angle sensor for detecting a rotational angle of the cam member;

a supercharging pressure sensor for detecting a supercharging pressure; and an electronic control unit, configured to estimate respective opening degrees of the first and second valves based on the rotational angle of the cam member detected by the cam angle sensor, set a target supercharging pressure based on the respective opening degrees of the first and second valve, and operate the actuator in order that the supercharging pressure detected by the supercharging pressure sensor is controlled at the target supercharging pressure.

2. The exhaust gas control apparatus according to the claim 1, wherein the second driving portion has a cam profile corresponding to the operational pattern for the second valve.

3. The exhaust gas control apparatus according to the claim 1, wherein the first valve controls the flow amounts of the exhaust gases mainly flowing through the first and second passages by its opening and/or closing movement.

4. The exhaust gas control apparatus according to the claim 1, wherein the second valve controls the flow amount of the exhaust gas mainly flowing through the bypass passage by its opening and/or closing movement.

5. The exhaust gas control apparatus according to the claim 1, wherein the turbine housing has:

an inlet portion formed at an upstream side of the wheel accommodating chamber in a flow direction of the exhaust gas;

an outlet portion formed at a downstream side of the wheel accommodating chamber in the flow direction of the exhaust gas;

a first branch-out portion at which the second passage is branched out from the first passage; and a second branch-out portion at which the bypass passage is branched out from the second passage.

6. The exhaust gas control apparatus according to the claim 1, wherein the actuator and the valve interlocking mechanism are arranged at an outer side of the turbine housing.

7. The exhaust gas control apparatus according to the claim 1, wherein the electronic control unit sets a valve driving mode to a first mode when an engine operational condition is in a low speed operation, in which both of the first and second valves are closed, the electronic control unit sets the valve driving mode to a second mode when the engine operational condition is in a middle speed operation, in which the first valve is opened and the second valve is closed, and the electronic control unit sets the valve driving mode to a third mode when the engine operational condition is in a high speed operation, in which both of the first and second valves are opened.

8. The exhaust gas control apparatus according to claim 1, wherein the turbocharger comprises:

the turbine housing for rotatably accommodating the turbine wheel;

a compressor housing for rotatably accommodating a compressor wheel; and a center housing arranged between the turbine housing and the compressor housing, wherein the actuator and the cam member are attached to one of members of the turbocharger, which include the compressor housing and the center housing but does not include the turbine housing.

9. The exhaust gas control apparatus according to the claim 2, wherein the cam profile has a valve closing area, according to which the second valve is closed when rotational angle of the cam member is changed from a minimum value to an intermediate value, and the cam profile has a valve opening area, according to which the second valve is opened when rotational angle of the cam member is changed from the intermediate value to a maximum value.

10. The exhaust gas control apparatus according to the claim 5, wherein the first passage forms a first exhaust gas flow-in passage for introducing the exhaust gas from the inlet portion into the wheel accommodating chamber, the second passage forms a second exhaust gas flow-in passage for introducing the exhaust gas from first branch-out portion into the wheel accommodating chamber, the bypass passage forms a waste-gate passage for bypassing the wheel accommodating chamber and introducing the exhaust gas from the second branch-out portion into the outlet portion, the first branch-out portion has a first communication through-hole opened and/or closed by the first valve, and the second branch-out portion has a second communication through-hole opened and/or closed by the second valve.

11. The exhaust gas control apparatus according to the claim 8, wherein each of the first and second valves has a return spring for bringing an opening degree of each of the first and second valves to its initial condition.

12. The exhaust gas control apparatus according to the claim 8, wherein each of the first and second valves is respectively driven by the cam groove formed in the cam member.

13. The exhaust gas control apparatus according to the claim 8, wherein the first valve is a flow rate control valve for controlling the amount of the exhaust gas to be supplied to the turbine wheel; and the second valve is a waste-gate valve for controlling the amount of the exhaust gas bypassing the turbine wheel.

14. The exhaust gas control apparatus according to the claim 12, wherein the cam groove is composed of:

a concentric arc portion having a center which coincides with a rotational center of the cam member;

a first cam portion connected to one end of the concentric arc portion for driving the first valve; and a second cam portion connected to the other end of the concentric arc portion for driving the second valve.

15. The exhaust gas control apparatus according to the claim 14, wherein the first cam portion is formed by an arc portion, a curvature radius of which is equal to or larger than that of the concentric arc portion, and the second cam portion is formed by an arc portion, a curvature radius of which is equal to or smaller than that of the concentric arc portion.

* * * * *